United States Patent
Kitamura et al.

(10) Patent No.: US 6,323,618 B1
(45) Date of Patent: Nov. 27, 2001

(54) EXCITATION CONTROLLER AND EXCITATION CONTROL METHOD FOR STABILIZING VOLTAGE IN ELECTRIC POWER SYSTEM

(75) Inventors: Hitomi Kitamura; Seiichi Tanaka; Masaru Shimomura, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/594,730

(22) Filed: Jun. 16, 2000

(30) Foreign Application Priority Data

Feb. 28, 2000 (JP) .................................................. 12-050569

(51) Int. Cl.$^7$ ....................................................... H02P 1/46
(52) U.S. Cl. ........................... 318/700; 318/714; 323/205; 323/301
(58) Field of Search ..................................... 318/700, 713, 318/714; 323/204, 205, 299–301; 322/17, 22–25

(56) References Cited

U.S. PATENT DOCUMENTS 3,663,948 * 5/1972 Nagae et al. .......................... 323/204
4,264,951 * 4/1981 Konishi et al. ......................... 363/35
4,999,564 * 3/1991 D'Antonio et al. .................... 322/25

FOREIGN PATENT DOCUMENTS 2809833    7/1998 (JP) .

\* cited by examiner

*Primary Examiner*—Marlon T. Fletcher
(74) *Attorney, Agent, or Firm*—Leydig, Voit & Mayer, Ltd.

(57) ABSTRACT

An excitation controller includes a reactive current detector for detecting a reactive current output from a synchronous machine connected, by way of a tap-changer-equipped transformer including a tap changer for changing taps of the transformer under load conditions, to a transmission system, a tap controller for setting a tap ratio of the tap-changer-equipped transformer according to an output terminal voltage of the synchronous machine, and a voltage setter for setting a reference voltage for an output voltage of the synchronous machine based on a second reference voltage of the tap-changer-equipped transformer at a side connected to the transmission system, the tap ratio set by the tap controller, and the reactive current detected by the reactive current detector. The excitation controller further includes a control unit for controlling an excitation system for exciting the synchronous machine according to the first reference voltage set by the voltage setter.

15 Claims, 18 Drawing Sheets

21: $V_H = V_{Href} - X_{DR} * I_Q$
22: $V_H = V_{Href} - X_{DR} * (I_Q - I_{Q0})$

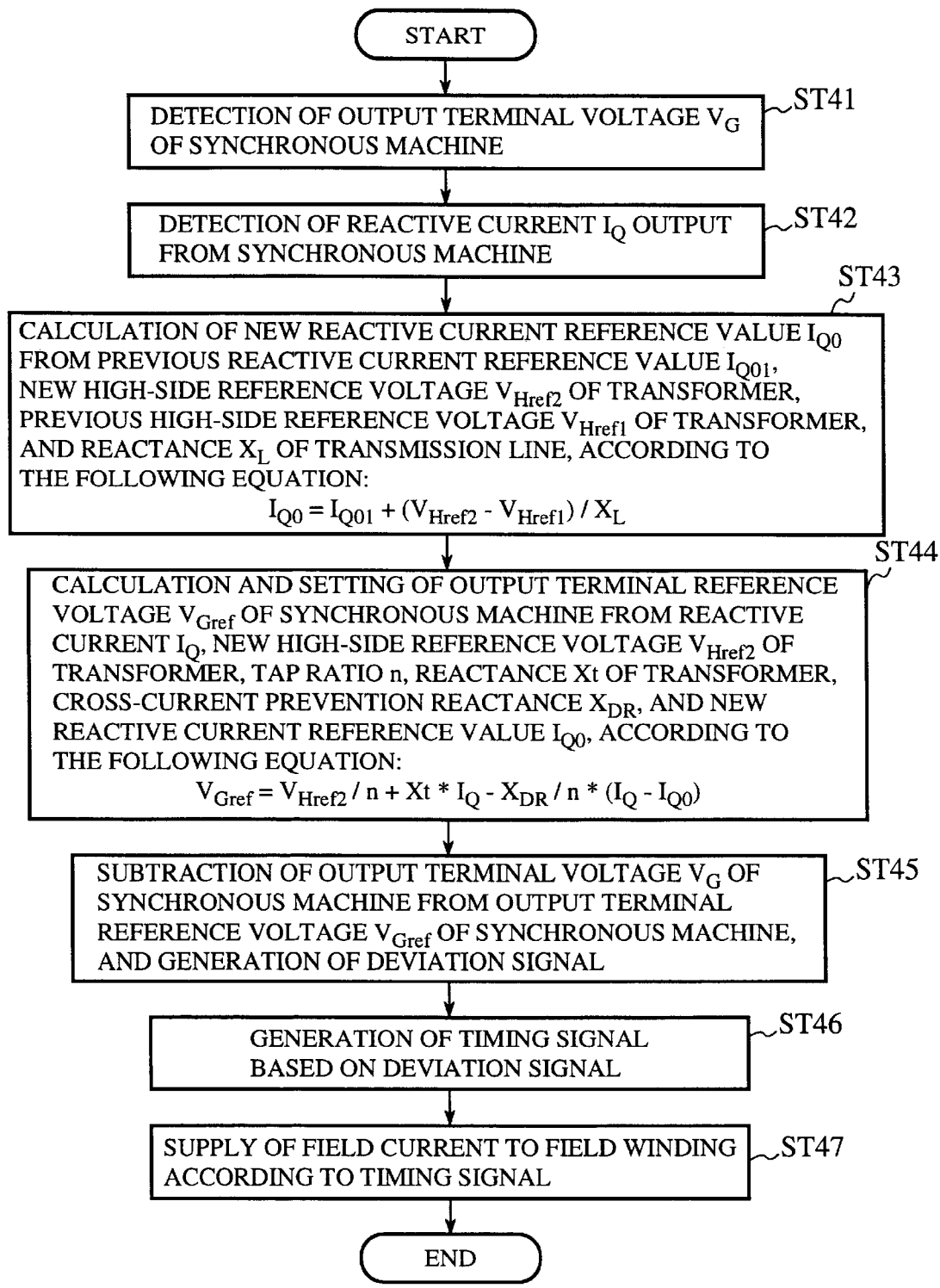

31 : $V_{H1} = V_{Href} - \{ X_{DR} - (n_v - n_{r1}) * X_t \} * I_{Q1}$
32 : $V_{H2} = V_{Href} - \{ X_{DR} - (n_v - n_{r2}) * X_t \} * I_{Q2}$

EXCITATION CONTROLLER AND EXCITATION CONTROL METHOD FOR STABILIZING VOLTAGE IN ELECTRIC POWER SYSTEM

BACKGROUND OF THE INVENTION

1. Field of the Invention

The present invention relates to an excitation controller and an excitation control method for stabilizing voltage in an electric power system.

2. Description of the Prior Art

Prior art excitation controllers detect a high-side voltage of a transformer connected to a synchronous machine or generator and then control the synchronous machine according to the detected voltage such that the high-side voltage has a constant value, in order to improve the stability of the electric power system, as disclosed in Japanese patent application publication (TOKKAIHEI) No.4-79798, for example.

Referring next to FIG. 23, there is illustrated a block diagram showing the structure of a prior art excitation controller as disclosed in Japanese patent application publication (TOKKAIHEI) No.4-79798. As shown in the figure, a first potential transformer or PT 102 detects an output terminal voltage $V_G$ of a synchronous machine 101, and a subtracter 104 subtracts the detected output terminal voltage $V_G$ from a reference voltage $r_G$ set by a voltage setter 103. A reduced gain circuit 105 then multiplies the result of the subtraction from the subtracter 104 by a gain $\beta$.

A second potential transformer or PT 109 detects a transmission voltage $V_H$ on a transmission bus 106 (i.e., a high-side voltage of a transformer 108 connected, by way of a breaker 107, to the transmission bus 106), and a second subtracter 111 subtracts the detected transmission voltage $V_H$ from a transmission reference voltage $r_H$ set by a high-side voltage setter 110. A high-voltage gain circuit 112 then multiplies the result of the subtraction from the second subtracter 111 by a gain $K_H$.

Then an adder 113 adds the result of the multiplication from the reduced gain circuit 105 and the result of the multiplication from the high-voltage gain circuit 112 together. An automatic voltage regulator or AVR 114 generates a timing signal for controlling the rectifying timing of an exciter 115 based on the result of the addition from the adder 113. The exciter 115 receives the timing signal and then supplies a field current to a field winding 116 of the synchronous machine 101 according to the timing signal.

In this way, the prior art excitation controller detects the high-side voltage of the transformer 108, and then controls the synchronous machine such that the transmission voltage on the transmission bus 106 remains constant.

A problem with a prior art excitation controller constructed as above is that although it can keep the high-side voltage of a transformer connected to a synchronous machine constant, in addition to an excitation control panel on which an AVR and an adder are mounted, another control panel is needed for mounting a high-side voltage setter, a potential transformer, a reference value correction circuit, and so on thereon, thus increasing the manufacturing cost of the electric power system.

Another problem is that since a transmission bus is located at a considerable distance from an electric power plant building for housing the synchronous machine, the transformer, and so on, a long cable susceptible to noise is needed to connect an excitation control panel located in the electric power plant building to a PT located in the vicinity of the transmission bus, thus decreasing the reliability of the electric power system.

A further problem is that an expensive PT is needed to detect the transmission voltage on the transmission bus and hence the manufacturing cost of the electric power system is increased.

A still further problem is that since when a transformer equipped with a tap changer for changing taps under load conditions is provided, the tap-changer-equipped transformer including an automatic tap control function, changing taps changes the transformation ratio, it is difficult to maintain the output terminal voltage of the generator at a nominal value and to keep the transmission voltage on the transmission bus constant. Another problem is that since the reactance $X_t$ of the tap-changer-equipped transformer changes with a change in taps of the tap-changer-equipped transformer as this results in a change in the ratio of a cross-current prevention reactance $X_{DR}$ for preventing any cross current from flowing between the synchronous machine and another synchronous machine, to the reactance $X_t$ of the tap-changer-equipped transformer, a cross current can flow among a plurality of synchronous machines including the above-mentioned synchronous machines, which operate in parallel with one another, if the plurality of synchronous machines have different transformation ratios.

SUMMARY OF THE INVENTION

The present invention is proposed to solve the above problems. It is therefore an object of the present invention to provide an excitation controller and an excitation control method capable of maintaining the output terminal voltage of a synchronous machine or generator, at a nominal value and keeping the transmission voltage on a transmission bus constant without having to detect the transmission voltage on the transmission bus.

In accordance with one aspect of the present invention, there is provided an excitation controller comprising: a reactive current detector for detecting a reactive current output from a synchronous machine connected, by way of a tap-changer-equipped transformer equipped with a tap changer for changing taps under load conditions, to a transmission system; a tap controller for setting a tap ratio of the tap-changer-equipped transformer according to an output terminal voltage of the synchronous machine; a voltage setter for setting a synchronous machine's-side reference voltage of the tap-changer-equipped transformer on the basis of a transmission system's-side reference voltage of the tap-changer-equipped transformer, the tap ratio set by the tap controller, and the reactive current detected by the reactive current detector; and a controlling unit for controlling an excitation system for exciting the synchronous machine according to the reference voltage set by the voltage setter.

In accordance with a preferred embodiment of the present invention, the voltage setter obtains the synchronous machine's-side reference voltage by dividing the transmission system's-side reference voltage of the tap-changer-equipped transformer by the tap ratio, and by adding a voltage drop in the tap-changer-equipped transformer to a result of the division, the voltage drop being obtained from the reactive current. Preferably, another synchronous machine can be connected to the transmission system, and the voltage setter can obtain the voltage drop on the basis of a reactance of the tap-changer-equipped transformer and a cross-current prevention reactance for preventing any cross current from flowing between the synchronous machine and the other synchronous machine.

In accordance with another preferred embodiment of the present invention, the voltage setter obtains the synchronous machine's-side reference voltage by dividing the transmission system's-side reference voltage of the tap-changer-equipped transformer by a step-up ratio corresponding to the tap ratio, and by adding a voltage drop in the tap-changer-equipped transformer to a result of the division, the voltage drop being obtained from a reactance change ratio corresponding to the tap ratio. Preferably, another synchronous machine can be connected to the transmission system, and the voltage setter can obtain the voltage drop on the basis of the step-up ratio, the reactance change ratio, and a cross-current prevention reactance for preventing any cross current from flowing between the synchronous machine and the other synchronous machine.

In accordance with another preferred embodiment of the present invention, when the reactive current has a predetermined reference value other than zero, the voltage setter sets the synchronous machine's-side reference voltage of the tap-changer-equipped transformer in such a manner that the voltage drop due to the cross-current prevention reactance becomes zero.

In accordance with another aspect of the present invention, there is provided an excitation control method comprising the steps of: setting a synchronous machine's-side reference voltage of a tap-changer-equipped transformer equipped with a tap changer for changing taps under load conditions on the basis of a reactive current output from a synchronous machine connected, by way of the tap-changer-equipped transformer, to a transmission system, a tap ratio of the tap-changer-equipped transformer, and a transmission system's-side reference voltage of the tap-changer-equipped transformer; and controlling an excitation system for exciting the synchronous machine according to the reference voltage set in the setting step.

In accordance with a preferred embodiment of the present invention, the setting step includes the step of obtaining the synchronous machine's-side reference voltage by dividing the transmission system's-side reference voltage of the tap-changer-equipped transformer by the tap ratio, and by adding a voltage drop in the tap-changer-equipped transformer to a result of the division, the voltage drop being obtained from the reactive current. Preferably, the setting step includes the step of obtaining the voltage drop on the basis of a reactance of the tap-changer-equipped transformer and a cross-current prevention reactance for preventing any cross current from flowing between the synchronous machine and another synchronous machine connected to the transmission system.

In accordance with another preferred embodiment of the present invention, the setting step includes the step of obtaining a step-up ratio and a reactance change ratio corresponding to the tap ratio, and the step of obtaining the synchronous machine's-side reference voltage by dividing the transmission system's-side reference voltage of the tap-changer-equipped transformer by the step-up ratio, and by adding a voltage drop in the tap-changer-equipped transformer to a result of the division, the voltage drop being obtained from the reactance change ratio. Preferably, the setting step includes the step of obtaining the voltage drop on the basis of the step-up ratio, the reactance change ratio, and a cross-current prevention reactance for preventing any cross current from flowing between the synchronous machine and another synchronous machine connected to the transmission system.

In accordance with another preferred embodiment of the present invention, the setting step is the step of setting the synchronous machine's-side reference voltage of the tap-changer-equipped transformer in such a manner that the voltage drop due to the cross-current prevention reactance becomes zero, when the reactive current has a predetermined reference value other than zero. The excitation control method can further comprise the step of setting the predetermined reference value according to a transmission system's-side voltage of the tap-changer-equipped transformer. As an alternative, the excitation control method can further comprise the step of setting the predetermined reference value according to a difference between a previous transmission system's-side reference voltage of the tap-changer-equipped transformer and a new transmission system's-side reference voltage of the tap-changer-equipped transformer, and a reactance of a transmission line of the transmission system. Preferably, the excitation control method further comprises the step of estimating the reactance of the transmission line of the transmission system, which can vary with time.

Further objects and advantages of the present invention will be apparent from the following description of the preferred embodiments of the invention as illustrated in the accompanying drawings.

BRIEF DESCRIPTION OF THE DRAWINGS

FIG. 13 is a flow diagram showing an excitation control method according to a fourth embodiment of the present invention;

DETAILED DESCRIPTION OF THE PREFERRED EMBODIMENTS

First Embodiment

Figure 1:
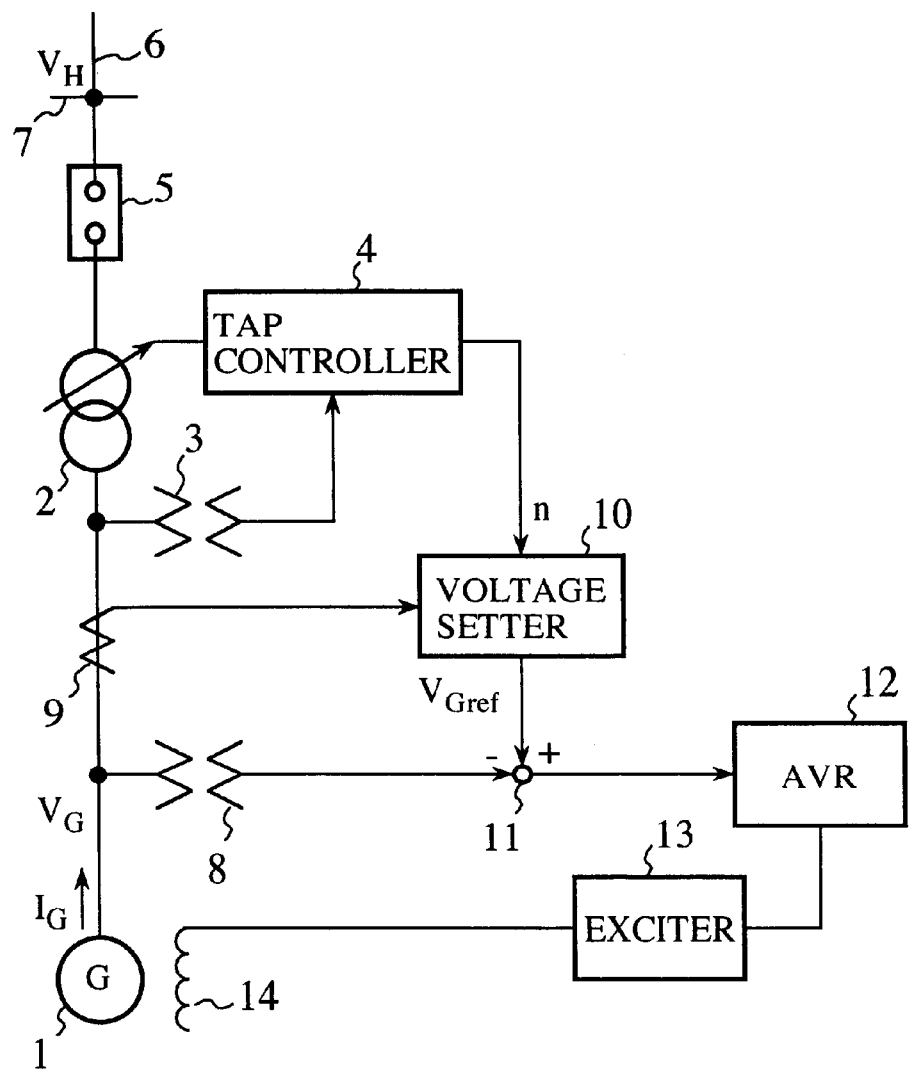
FIG. 1 is a block diagram showing the structure of an electric power system provided with an excitation controller according to a first embodiment of the present invention.
Figure 2:
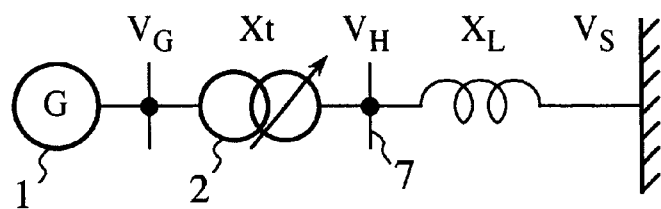
FIG. 2 is a system diagram showing the electric power system as shown in FIG. 1.

Referring next to FIG. 1, there is illustrated a block diagram showing the structure of an electric power system provided with an excitation controller according to a first embodiment of the present invention. FIG. 2 is a system diagram showing the electric power system shown in FIG. 1. In the figures, reference numeral 1 denotes a synchronous machine, numeral 2 denotes a tap-changer-equipped transformer equipped with a tap changer for changing a tap ratio according to an actual output terminal voltage $V_G$ of the synchronous machine 1 under load conditions, numeral 3 denotes a first potential transformer or PT for detecting the actual output terminal voltage $V_G$ of the synchronous machine 1, numeral 4 denotes a tap controller for controlling the tap ratio n of the tap-changer-equipped transformer 2 according to the output terminal voltage $V_G$ detected by the first PT 3, numeral 5 denotes a breaker, numeral 6 denotes a transmission line, numeral 7 denotes a transmission bus of a power plant, numeral 8 denotes a second potential transformer or PT for detecting the actual output terminal voltage $V_G$ of the synchronous machine 1, and numeral 9 denotes a current transformer for detecting a reactive current $I_Q$ output from the synchronous machine 1.

Furthermore, reference numeral 10 denotes a voltage setter for setting a synchronous machine's-side reference voltage $V_{Gref}$ of the tap-changer-equipped transformer 2 (i.e., an output terminal reference voltage of the synchronous machine 1) on the basis of the reactive current $I_Q$ detected by the CT 9, the tap ratio n controlled by the tap controller 4, and a transmission's-side (i.e., high-side) reference voltage $V_{Href}$ of the tap-changer-equipped transformer 2.

Reference numeral 11 denotes a subtracter for subtracting the output terminal voltage $V_G$ detected by the second PT 8 from the output terminal reference voltage $V_{Gref}$ set by the voltage setter 10, and for furnishing a deviation signal having a value corresponding to the result of the subtraction, and numeral 12 denotes an automatic voltage regulator or AVR for controlling the rectifying timing of an exciter 13 on the basis of the deviation signal fed from the subtracter 11. The exciter 13 can supply a field current to a field winding 14 of the synchronous machine 1 according to an instruction from the AVR 12. The AVR 12 and the exciter 13 control the excitation system for exciting the synchronous machine. In FIG. 2, $X_t$ designates a reactance of the tap-changer-equipped transformer 2, $X_L$ designates a reactance of the transmission line, and $V_S$ designates an infinite voltage of the transmission bus.

Figure 3:
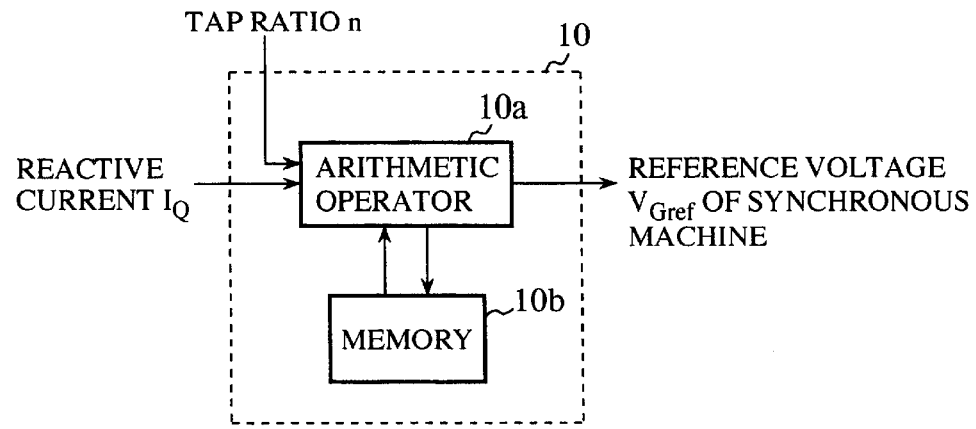
FIG. 3 is a block diagram showing the structure of an example of a voltage setter as shown in FIG. 1.

Referring next to FIG. 3, there is illustrated a block diagram showing the structure of the voltage setter 10 as shown in FIG. 1. In the figure, reference numeral 10a denotes an arithmetic operator, and numeral 10b denotes a memory in which the high-side reference voltage $V_{Href}$, the reactance $X_t$ of the tap-changer-equipped transformer 2, and so on are stored. The arithmetic operator 10a can compute the output terminal reference voltage $V_{Gref}$ using the contents of the memory 10b.

Figure 4:
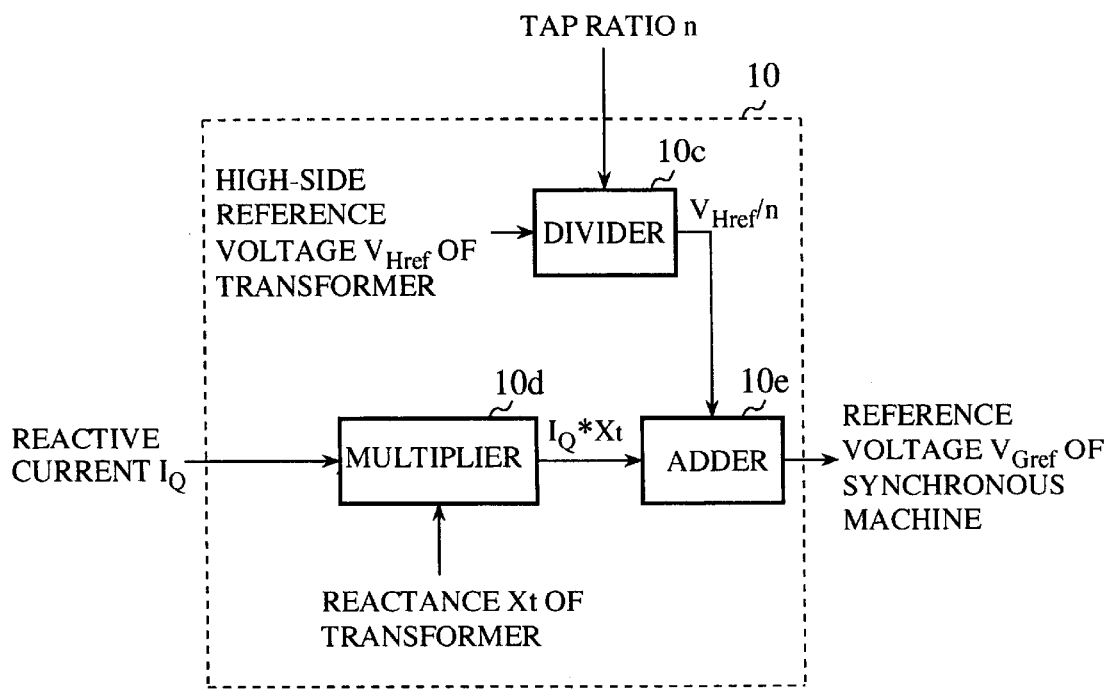
FIG. 4 is a block diagram showing the structure of another example of the voltage setter as shown in FIG. 1.

The voltage setter 10 is not limited to the one as shown in FIG. 3. As an alternative, the voltage setter 10 can be implemented via hardware components such as a divider 10c, a multiplier 10d, and an adder 10e, as shown in FIG. 4.

Figure 5:
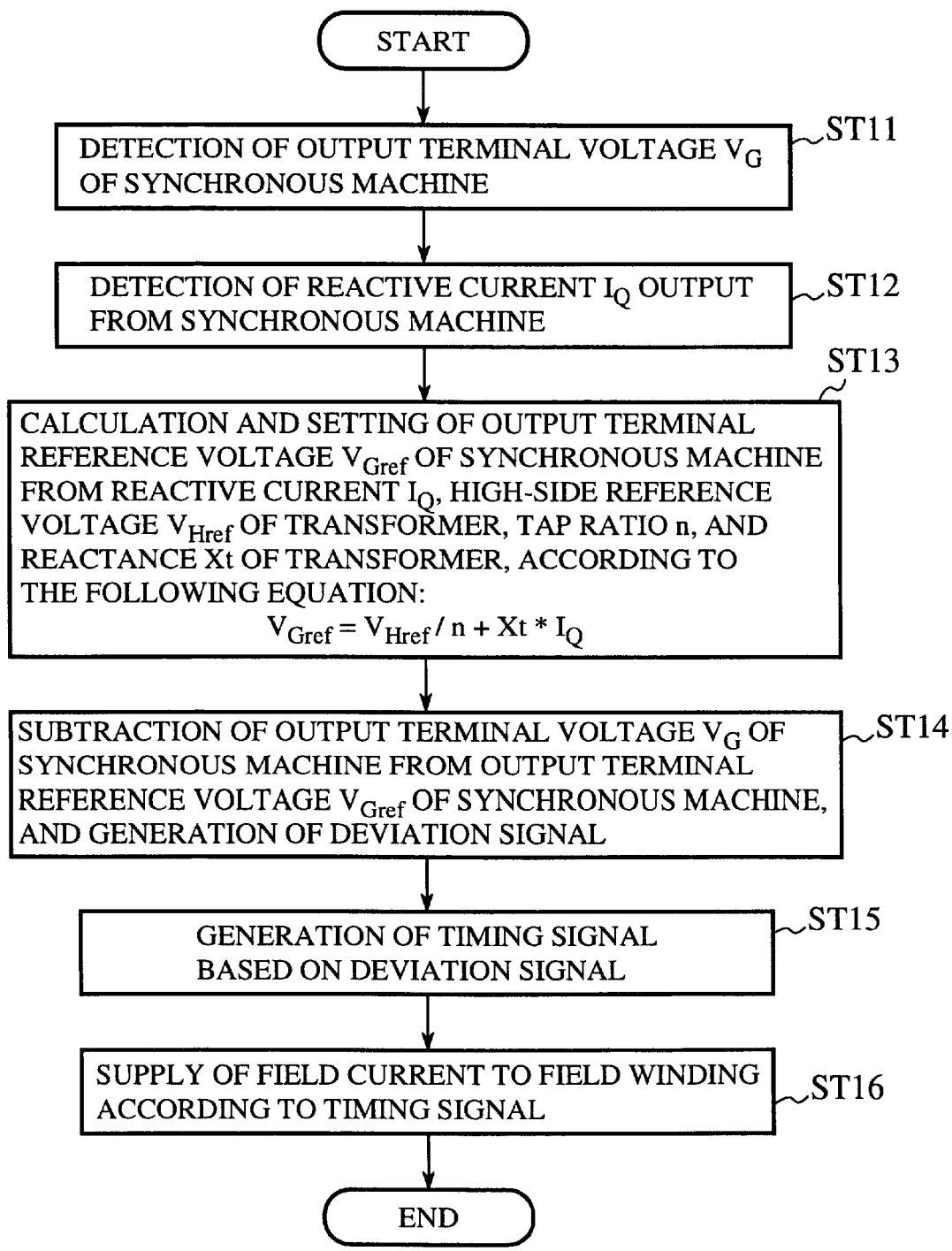
FIG. 5 is a flow diagram showing an excitation control method according to the first embodiment of the present invention.

Next, a description will be made as to the operation of the excitation controller of the first embodiment with reference to FIG. 5, a flowchart of an excitation control method in accordance with the first embodiment of the present invention.

The second PT 8, in step ST11, detects the actual output terminal voltage $V_G$ of the synchronous machine 1, and the CT 9, in step ST12, detects the reactive current $I_Q$ output from the synchronous machine 1. Then the voltage setter 10, in step ST13, calculates and sets the output terminal reference voltage $V_{Gref}$ from the detected reactive current $I_Q$, the tap ratio n controlled by the tap controller 4, and the high-side reference voltage $V_{Href}$ of the tap-changer-equipped transformer 2, according to the following equation (1):

$$V_{Gref} = V_{Href}/n + X_t * I_Q \qquad (1)$$

where $X_t$ is the reactance of the tap-changer-equipped transformer 2. The high-side reference voltage $V_{Href}$ can be determined according to desired operation conditions set for the electric power plant.

After the voltage setter 10 has set the output terminal reference voltage $V_{Gref}$ of the synchronous machine 1 in this way, the subtracter 11, in step ST14, subtracts the actual output terminal voltage $V_G$ of the synchronous machine 1, which has been detected by the second PT 8, from the output terminal reference voltage $V_{Gref}$ set by the voltage setter 10, and furnishes the deviation signal having a value corresponding to the result of the subtraction to the AVR 12.

The AVR 12 then, in step ST15, generates a timing signal on the basis of the deviation signal output from the subtracter 11 to control the rectifying timing of the exciter 13. The exciter 13, in step ST16, receives the timing signal from the AVR 12 and supplies the field current to the field winding 14 of the synchronous machine 1 according to the timing signal.

Incidentally, if the deviation signal output from the subtracter 11 has a positive value, the field current fed to the field winding 14 is increased and hence the output terminal voltage $V_G$ of the synchronous machine 1 increases, whereas if the deviation signal output from the subtracter 11 has a negative value, the field current fed to the field winding 14 is decreased and hence the output terminal voltage $V_G$ of the synchronous machine 1 decreases. In this manner, the AVR 12 and the exciter 13 control the synchronous machine 1 so that the actual output voltage $V_G$ of the synchronous machine 1 is equal to the output terminal reference voltage $V_{Gref}$.

As can be seen from the system diagram of FIG. 2, when the tap ratio of the tap-changer-equipped transformer 2 is n, there is a relationship, as expressed by the following equation (2), between the output terminal voltage $V_G$ of the synchronous machine 1 and the high-side voltage $V_H$ of the tap-changer-equipped transformer 2.

$$V_H = n(V_G - X_t * I_Q) \quad (2)$$

Accordingly, using the high-side reference voltage $V_{Href}$, the output terminal voltage $V_G$ of the synchronous machine 1 and the high-side voltage $V_H$ of the tap-changer-equipped transformer 2 can be given by the following equations (3) and (4):

$$V_G = V_{Href}/n + X_t * I_Q \quad (3)$$

$$V_H = V_{Href} \quad (4)$$

Thus, when the actual output terminal voltage $V_G$ of the synchronous 1 under normal operating conditions is high, by increasing the tap ratio n (n>1) by means of the tap controller 4, the excitation controller of the first embodiment can maintain the actual output terminal voltage $V_G$ at about a nominal value. In addition, even though the tap ratio n is changed, the excitation controller of the first embodiment can control the actual high-side voltage $V_H$ of the tap-changer-equipped transformer 2 so that it is equal to the high-side reference voltage $V_{Href}$.

As previously mentioned, the excitation controller in accordance with the first embodiment of the present invention sets the output terminal reference voltage $V_{Gref}$ of the synchronous machine 1 from the reactive current $I_Q$ output from the synchronous machine 1, the tap ratio n of the tap-changer-equipped transformer 2, the high-side reference voltage $V_{Href}$ of the tap-changer-equipped transformer 2, and then controls the field current to be supplied to the field winding 14 of the synchronous machine 1 according to the difference between the output terminal reference voltage $V_{Gref}$ and the actual output terminal voltage $V_G$. Accordingly, even though transformer taps are changed in the tap-changer-equipped transformer 2 and hence the transformation ratio is changed, the excitation controller can hold the output terminal voltage $V_G$ of the synchronous machine 1 at about a nominal value and therefore keep the transmission bus 7 at a certain voltage. As a result, the excitation controller of the first embodiment can make the most of the ability of the generator even in the event of a failure on the transmission system or even in the event of a rapid increase in the load, thus offering a significant improvement in the voltage stability.

Furthermore, since there is no need to detect the high-side voltage of the tap-changer-equipped transformer 2, only one excitation control panel is needed in the vicinity of the synchronous machine. In other words, there is no need to provide two control panels, and this results in space savings.

In addition, since there is no need to detect the high-side voltage of the tap-changer-equipped transformer 2, there is no need to connect the excitation control panel in which the AVR, the adder and so on are included with the transmission bus through a cable or the like. Accordingly, noise that has a deleterious effect on the excitation controller can be reduced, thereby improving the reliability.

Moreover, since there is no need to provide an expensive PT for detecting the high-side voltage of the tap-changer-equipped transformer 2, the manufacturing cost can be reduced.

Embodiment 2

In the aforementioned first embodiment, it is assumed that only one synchronous machine is connected to the transmission system. In contrast, an excitation controller in accordance with a second embodiment of the present invention can control a plurality of synchronous machines connected to the transmission system. For simplicity, an electric power system provided with the excitation controller according to the second embodiment of the present invention includes two synchronous machines.

Figure 6:
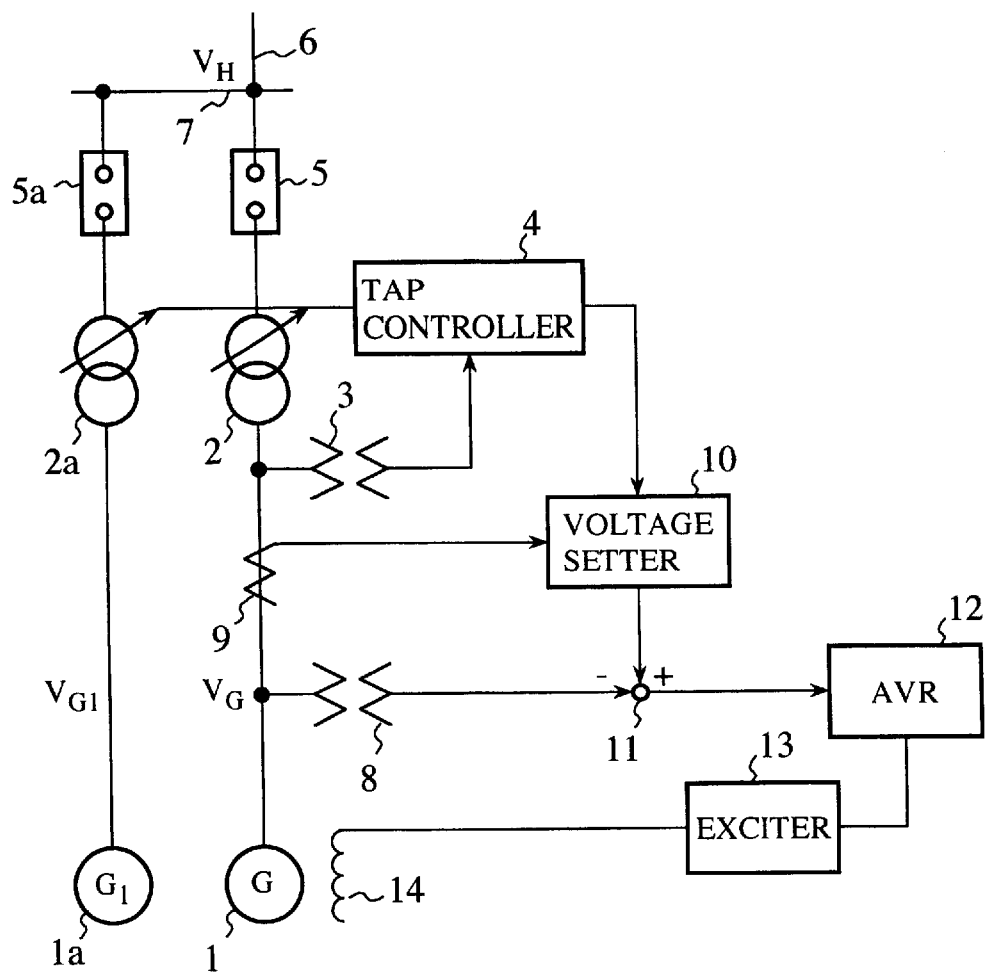
FIG. 6 is a block diagram showing the structure of an electric power system provided with an excitation controller according to a second embodiment of the present invention.
Figure 7:
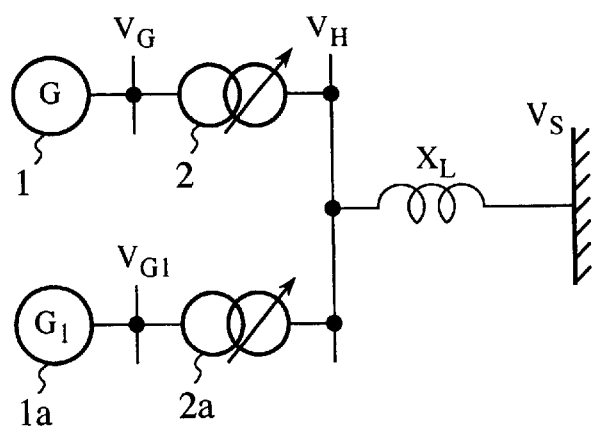
FIG. 7 is a system diagram showing the electric power system as shown in FIG. 6.

Referring next to FIG. 6, there is illustrated a block diagram showing the structure of the electric power system provided with the excitation controller according to the second embodiment of the present invention. FIG. 7 is a system diagram showing the electric power system shown in FIG. 6. In the figures, reference numeral 1a denotes another synchronous machine that differs from a first synchronous machine 1, numeral 2a denotes a second tap-changer-equipped transformer that differs from a first tap-changer-equipped transformer 2, the second tap-changer-equipped transformer being equipped with a tap changer for changing tap ratios according to the output terminal voltage $V_{G1}$ of the second synchronous machine 1a under load conditions, and numeral 5a denotes a second breaker. The other structure of the excitation controller of the second embodiment is the same as that of the excitation controller of the aforementioned first embodiment as shown in FIG. 1, with the exception that a voltage setter 10 of the second embodiment has a different mechanism for setting the output terminal reference voltage $V_{Gref}$ of the synchronous machine 1, and therefore the description of the same components will be omitted hereinafter. Also, the excitation controller according to the second embodiment includes first and second PTs for detecting the actual output terminal voltage $V_{G1}$ of the second synchronous machine 1a, a CT for detecting the reactive current output from the second synchronous machine 1a, a voltage setter for setting the output terminal reference voltage of the second synchronous machine 1a, an exciter for exciting the second synchronous machine 1a, and a subtracter and an AVR for controlling the exciter, which are not shown in FIG. 6.

Figure 8:
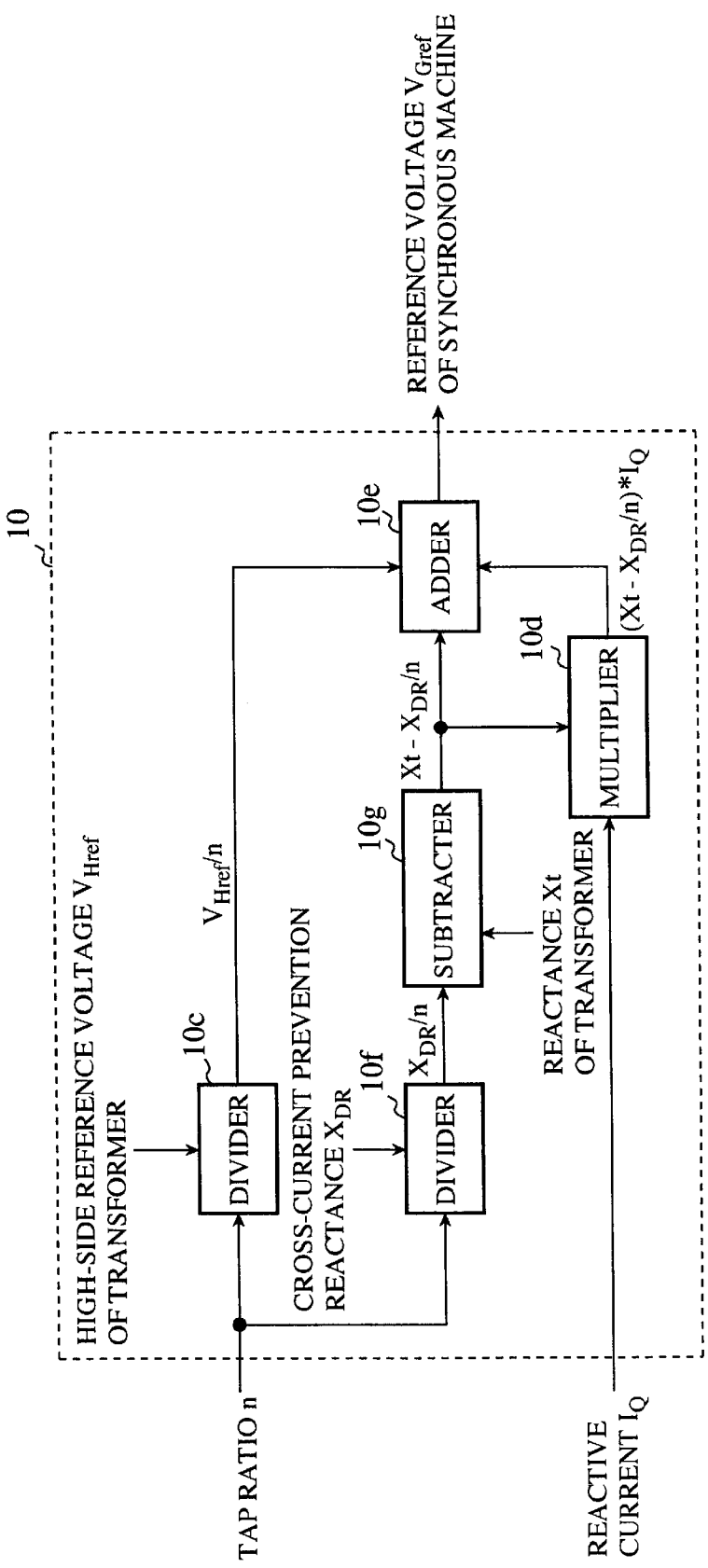
FIG. 8 is a block diagram showing the structure of an example of a voltage setter as shown in FIG. 6.

The voltage setter 10 can be implemented via hardware components including a second divider 10f and a subtracter 10g, as shown in FIG. 8, in addition to the hardware components of FIG. 3.

Figure 9:
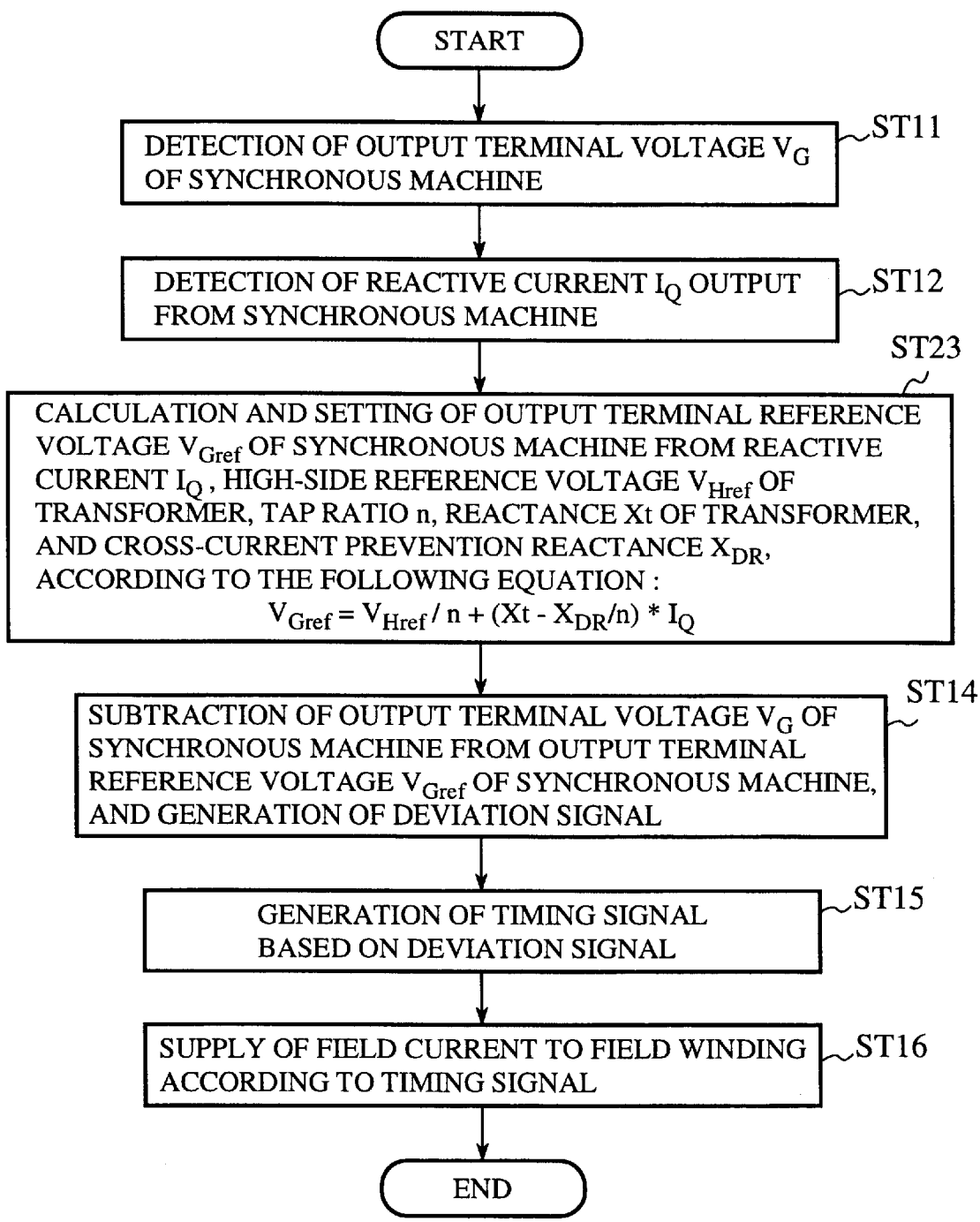
FIG. 9 is a flow diagram showing an excitation control method according to the second embodiment of the present invention.

Next, a description will be made as to the operation of the excitation controller of the second embodiment with reference to FIG. 9, a flowchart of an excitation control method in accordance with the second embodiment of the present invention. All steps of FIG. 9 except step ST23, which takes the place of ST13 of FIG. 5, are already shown in FIG. 5, and therefore the description of the same steps can be omitted hereinafter.

The voltage setter 10, in step ST23, calculates and sets the output terminal reference voltage $V_{Gref}$ of the first synchronous machine 1 from the detected reactive current $I_Q$, the tap ratio n controlled by the tap controller 4, and the high-side reference voltage $V_{Href}$ of the first tap-changer-equipped transformer 2, according to the following equation:

$$V_{Gref} = V_{Href}/n + (X_t - X_{DR}/n) * I_Q \quad (5)$$

where $X_t$ is the reactance of the tap-changer-equipped transformer 2, and $X_{DR}$ is a cross-current prevention reactance for preventing any cross current from flowing, by way of the transmission bus 7, among the plurality of synchronous machines connected to the transmission system.

Similarly, the other voltage setter (not shown) intended for the second synchronous machine 1a calculates and sets the output terminal reference voltage $V_{Gref}$ of the second synchronous machine 1a from the detected reactive current $I_Q$, the tap ratio n controlled by the tap controller 4, and the high-side reference voltage $V_{Href}$ of the second tap-changer-equipped transformer 2a, according to equation (5).

As shown in equation (5), since the output terminal reference voltage $V_{Gref}$ is set in consideration with the cross-current prevention reactance $X_{DR}$, no cross current flows among the plurality of synchronous machines connected to the transmission system, and the actual output terminal voltage $V_G$ is controlled such that it agrees with the output terminal reference voltage $V_{Gref}$.

As can be seen from the system diagram of FIG. 7, when the current tap ratio of the tap-changer-equipped transformer 2 is n, there is a relationship, as expressed by the following equation (6), between the output terminal voltage $V_G$ of the first synchronous machine 1 and the high-side voltage $V_H$ of the first tap-changer-equipped transformer 2.

$$V_H = n(V_G - X_t * I_Q) \quad (6)$$

Accordingly, using the high-side reference voltage $V_{Href}$, the output terminal voltage $V_G$ of the first synchronous machine 1 and the high-side voltage $V_H$ of the first tap-changer-equipped transformer 2 can be given by the following equations (7) and (8):

$$V_G = V_{Href}/n + (X_t - X_{DR}/n) * I_Q \quad (7)$$

$$V_H = V_{Href} - X_{DR} * I_Q \quad (8)$$

Thus, when the actual output terminal voltage $V_G$ of the first synchronous machine 1 under normal operating conditions is high, by increasing the tap ratio n (i.e., n>1) by means of the tap controller 4, the excitation controller of the second embodiment can maintain the actual output terminal voltage $V_G$ of the first synchronous machine 1 at about a nominal value. In addition, even though the current tap ratio is changed, the excitation controller of the second embodiment can control the actual high-side voltage $V_H$ of the first tap-changer-equipped transformer 2 such that it agrees with the high-side reference voltage $V_{Href}$. Similarly, the excitation controller can maintain the actual output terminal voltage $V_{G1}$ of the second synchronous machine 1a at about a nominal value, and control the actual high-side voltage $V_H$ of the second tap-changer-equipped transformer 2a such that it agrees with the high-side reference voltage $V_{Href}$, even though the current tap ratio of the second transformer 2a is changed.

As previously mentioned, the excitation controller in accordance with the second embodiment of the present invention sets the actual output terminal reference voltage $V_{Gref}$ of each of the plurality of synchronous machines in consideration with the cross-section prevention reactance $X_{DR}$. Accordingly, the present embodiment makes it possible to prevent any cross current from flowing among the plurality of synchronous machines that operate in parallel with one another even when the plurality of tap-changer-equipped transformers respectively connected to the plurality of synchronous machines have different transformation ratios.

Embodiment 3

The excitation controller in accordance with the second embodiment sets the output terminal reference voltage $V_{Gref}$ of each of the plurality of synchronous machines from the reactive current $I_Q$ output from each of the plurality of synchronous machines, the tap ratio n of the corresponding tap-changer-equipped transformer 2 or 2a, and the high-side reference voltage $V_{Href}$ of the plurality of tap-changer-equipped transformers 2 and 2a, according to equation (5). In this case, since the output terminal reference voltage $V_{Gref}$ of each of the plurality of synchronous machines is calculated in consideration with the cross-current prevention reactance $X_{DR}$, the high-side voltage $V_H$ of the plurality of tap-changer-equipped transformers 2 and 2a agrees with the reference voltage $V_{Href}$ only when the reactive current $I_Q=0$ (see equation (8)). However, when each of the plurality of generators operates under normal operating conditions, because of the reactive current $I_Q \neq 0$, it is impossible for the high-side voltage $V_H$ of the plurality of tap-changer-equipped transformers 2 and 2a to be made equal to the reference voltage $V_{Href}$.

In contrast, when all the generators operate under normal operating conditions, an excitation controller in accordance with a third embodiment sets the output terminal reference voltage $V_{Gref}$ of each of the plurality of synchronous machines such that the high-side voltage $V_H$ of the plurality of tap-changer-equipped transformers agrees with the reference voltage $V_{Href}$ when the reactive current $I_Q$ output from each of the plurality of synchronous machine agrees with a reference value $I_{Q0}$ other than zero.

Figure 10:
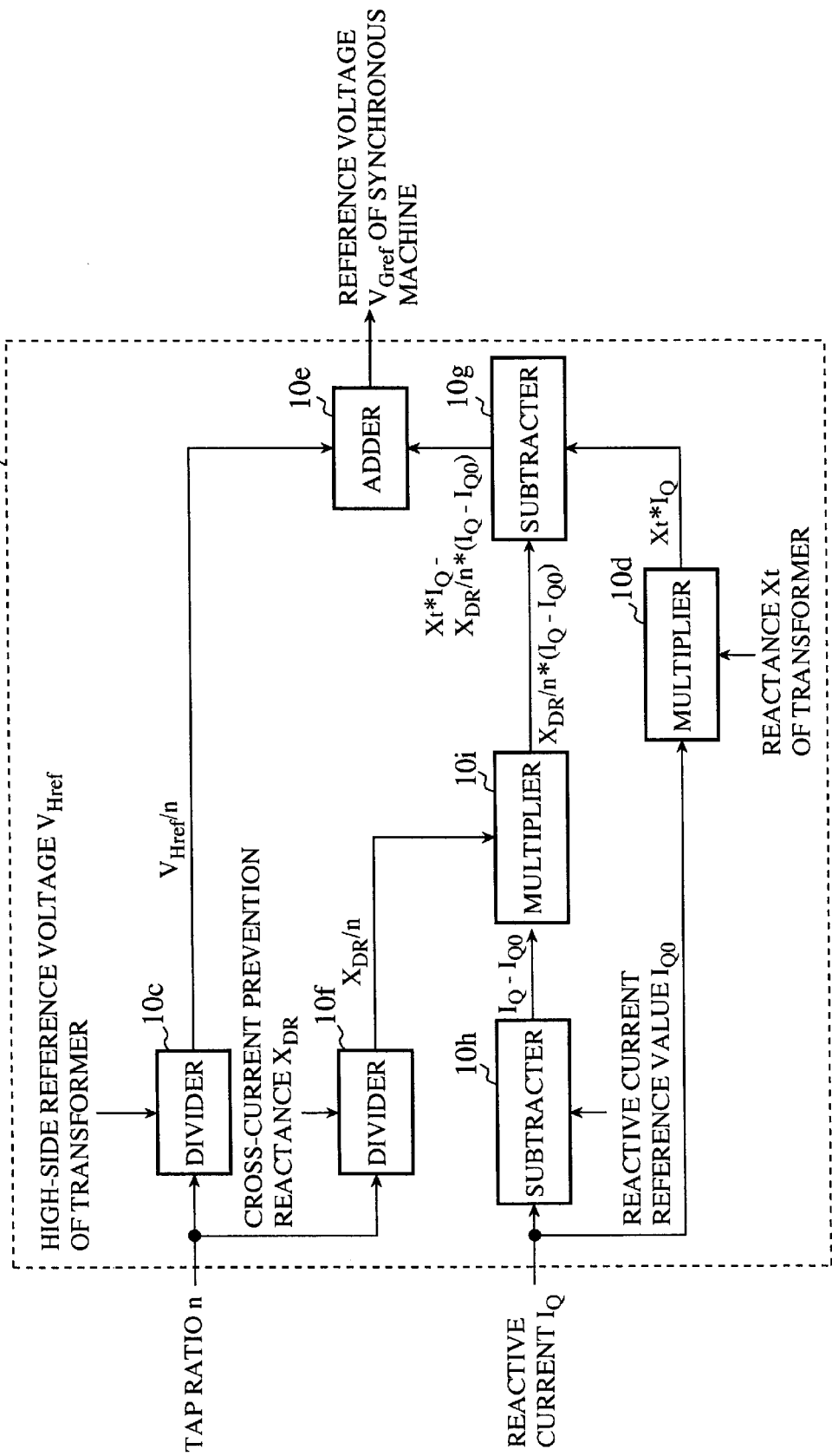
FIG. 10 is a block diagram showing the structure of an electric power system provided with an excitation controller according to a third embodiment of the present invention.

An electric power system including the excitation controller of the third embodiment has the same structure as that as shown in FIG. 6, and therefore the description of the structure will be omitted hereinafter. The voltage setter 10 can be implemented via hardware components including a second subtracter 10h and a second multiplier 10i, as shown in FIG. 10, in addition to the hardware components of FIG. 8.

Figure 11:
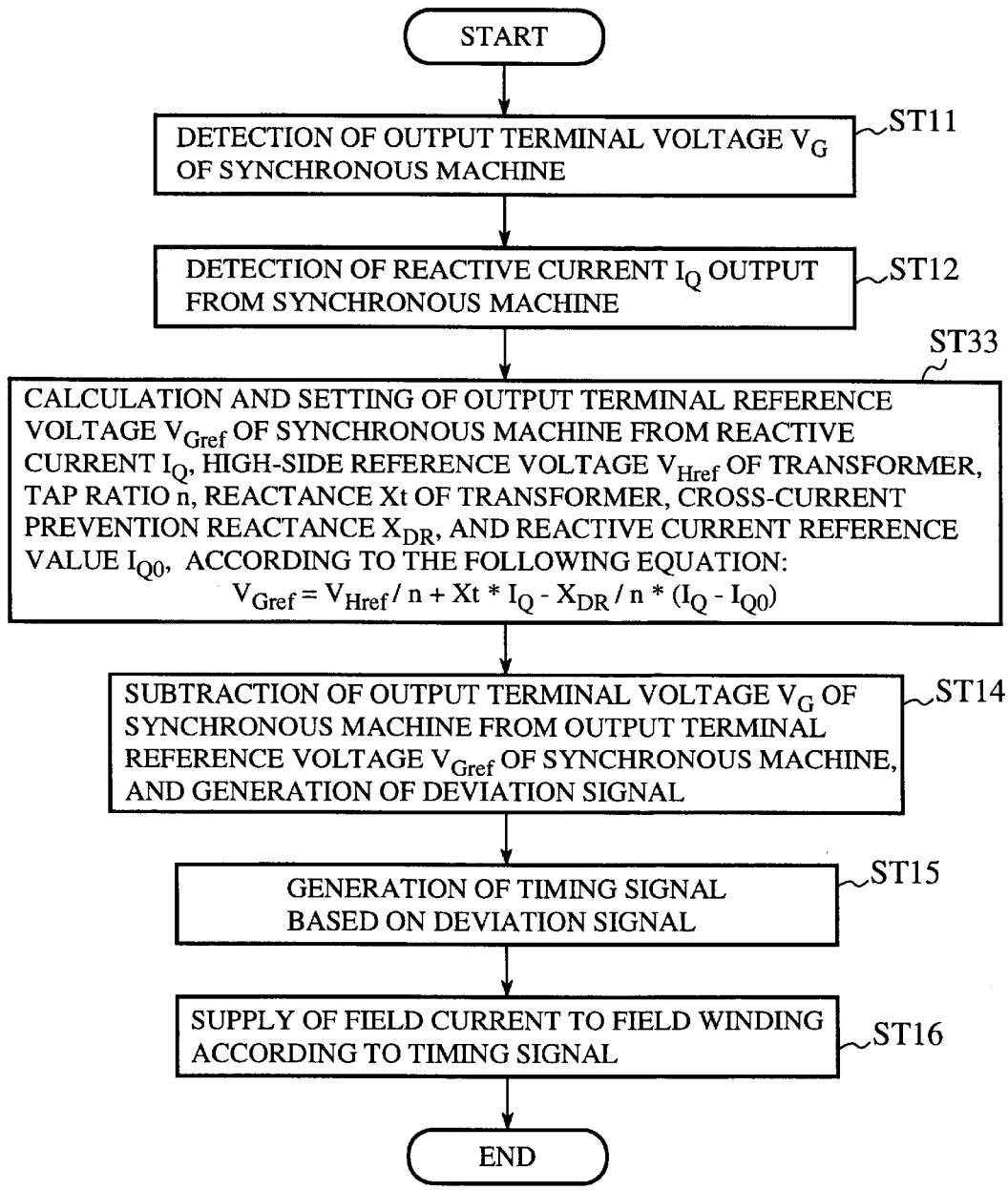
FIG. 11 is a flow diagram showing an excitation control method according to the third embodiment of the present invention.

Next, a description will be made as to the operation of the excitation controller of the third embodiment with reference to FIG. 11, a flowchart of an excitation control method in accordance with the third embodiment of the present invention. All steps of FIG. 11 except step ST33, which takes the place of ST13 of FIG. 5, are already shown in FIG. 5, and therefore the description of the same steps can be omitted hereinafter.

The voltage setter 10, in step ST33, calculates and sets the output terminal reference voltage $V_{Gref}$ of the first synchronous machine 1 from the reactive current $I_Q$ output from the first synchronous machine 1, the reactive current reference value $I_{Q0}$ other than 0, the tap ratio n of the first tap-changer-equipped transformer 2, and the high-side reference voltage $V_{Href}$ of the first tap-changer-equipped transformer 2, according to the following equation (9):

$$V_{Gref} = V_{Href}/n + X_t * I_Q - X_{DR}/n * (I_Q - I_{Q0}) \quad (9)$$

where the reference value $I_{Q0}$ can be given by $I_{Q0}=Q_S/V_g$, in which $V_g$ is the voltage of each generator and $Q_g$ is the reactive power in an operating state in which the high-side reference voltage=$V_{Href}$. $V_g$ and $Q_g$ are determined by the operating condition of each generator, system conditions and so on.

Similarly, the second voltage setter (not shown) intended for the second synchronous machine 1a calculates and sets the output terminal reference voltage $V_{Gref}$ of the second synchronous machine 1a from the reactive current $I_Q$ output from the second synchronous machine 1a, the reactive current reference value $I_{Q0}$ other than 0, the tap ratio n of the second tap-changer-equipped transformer 2a, and the high-side reference voltage $V_{Href}$ of the second tap-changer-equipped transformer 2a, according to equation (9).

In this way, the output terminal reference voltage $V_{Gref}$ of each of the first and second synchronous machines 1 and 1a is determined according to equation (9), and each of these synchronous machines is controlled according to the output terminal reference voltage $V_{Gref}$. As a result, the output voltage $V_G$ of each of the plurality of synchronous machines and the high-side voltage $V_H$ of the corresponding tap-changer-equipped transformer can be expressed as follows:

$$V_G = V_{Href}/n + X_t^* I_Q - X_{DR}/n^*(I_Q - I_{Q0}) \quad (10)$$

$$V_H = V_{Href} - X_{DR}^*(I_Q - I_{Q0}) \quad (11)$$

Figure 12:
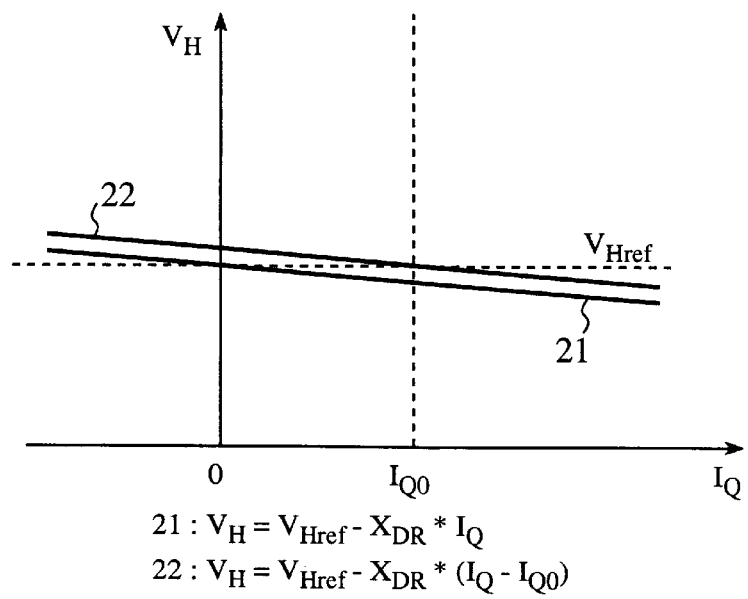
FIG. 12 is a graph showing a relationship between a reactive current output from a synchronous machine and a high-side voltage of a tap-changer-equipped transformer.

Referring next to FIG. 12, there is illustrated a graph showing a relationship between the reactive current $I_Q$ output from each of the plurality of synchronous machines and the high-side voltage $V_H$ of the corresponding tap-changer-equipped transformer. In the figure, reference numeral 21 denotes the high-side voltage $V_H$ of each of the plurality of tap-changer-equipped transformers 2 and 2a which is given by equation (8) as explained in Embodiment 2, and numeral 22 denotes the high-side voltage $V_H$ of each of the plurality of tap-changer-equipped transformers 2 and 2a which is given by equation (11) of the present embodiment. The horizontal axis shows the reactive current $I_Q$ and the vertical axis shows the high-side voltage $V_H$.

As shown in FIG. 12, the relationship designated by 21 (equation (8)) indicates that the high-side voltage $V_H$ of the corresponding tap-changer-equipped transformer 2 or 2a is equal to the reference voltage $V_{Href}$ only when the reactive current $I_Q=0$, whereas the relationship designated by 22 (equation (11)) indicates that the high-side voltage $V_H$ of the corresponding tap-changer-equipped transformer 2 or 2a is equal to the reference voltage $V_{Href}$ when the reactive current $I_Q = I_{Q0}$ other than zero. In other words, when the reactive current $I_Q$ has a certain reference value other than zero, the voltage drop due to the cross-current prevention reactance becomes zero.

As previously mentioned, the excitation controller in accordance with the third embodiment sets the output terminal reference voltage $V_{Gref}$ of each of the plurality of synchronous machines such that the actual high-side voltage $V_H$ of the plurality of tap-changer-equipped transformers agrees with the reference voltage $V_{Href}$ when the reactive current $I_Q$ output from each of the plurality of synchronous machines is equal to its reference value $I_{Q0}$ other than zero. Accordingly, the present embodiment offers an advantage of being able to make the actual high-side voltage $V_H$ of the plurality of tap-changer-equipped transformers agree with the reference voltage $V_{Href}$ more precisely than the aforementioned second embodiment does, and to maintain the actual output terminal voltage $V_G$ of each of the plurality of synchronous machines at about a nominal value.

Embodiment 4

The excitation controller of the aforementioned third embodiment controls each of the plurality of synchronous machines using the reactive current reference value $I_{Q0}$ corresponding to the high-side reference voltage $V_{Href}$ of the corresponding tap-changer-equipped transformer. In this case, if the high-side reference voltage of the plurality of tap-changer-equipped transformers is changed from $V_{Href1}$ to $V_{Href2}$ in an operating state in which the reactive current reference value $I_{Q0} = I_{Q01}$ and the high-side voltage $V_H$ of each of the plurality of tap-changer-equipped transformers= $V_{Href1}$, the varied (i.e., new) high-side voltage $V_{H2}$ of each of the plurality of tap-changer-equipped transformers is expressed as follows because the reactive current $I_Q$ also changes from $I_{Q1}$ to $I_{Q2}$.

$$V_{H2} = V_{Href2} - X_{DR}^*(I_{Q2} - I_{Q01}) \quad (12)$$

However, the high-side voltage $V_{H2}$ of each of the plurality of tap-changer-equipped transformers does not agree with the varied reference voltage $V_{Href2}$ because $I_{Q2} \neq I_{Q01}$ in equation (12).

In contrast, an excitation controller in accordance with a fourth embodiment can set a reactive current reference value $I_{Q0}$ corresponding to the varied reference voltage $V_{Href2}$ on the basis of the difference between the previous high-side reference voltage $V_{Href1}$ and the varied or new reference voltage $V_{Href2}$ and the reactance of the transmission line so as to make the high-side voltage $V_{H2}$ of the plurality of tap-changer-equipped transformers agree with the varied reference voltage $V_{Href2}$.

An electric power system including the excitation controller of the fourth embodiment has the same structure as that as shown in FIG. 6, and therefore the description of the structure will be omitted hereinafter. The voltage setter 10 can be implemented via hardware components as shown in FIG. 10, so as to change the reactive current reference value $I_{Q0}$ as the high-side reference voltage $V_{Href}$ of the plurality of tap-changer-equipped transformers changes.

Next, a description will be made as to the operation of the excitation controller of the fourth embodiment with reference to FIG. 13, a flowchart of an excitation control method in accordance with the fourth embodiment of the present invention. In the flowchart of FIG. 13, steps ST41, ST42, and ST45 to ST47 are the same as steps ST11, ST12, and ST14 to ST16 of FIG. 5, and therefore the description of those steps will be omitted hereinafter.

The voltage setter 10, in step ST43, calculates a new reactive current reference value $I_{Q0}$ by subtracting the previous reference voltage $V_{Href1}$ from the varied or new reference voltage $V_{Href2}$, followed by dividing the result of the subtraction by the reactance $X_L$ of the transmission line 6, and by adding the result of the division to the previous reference value $I_{Q01}$, according to the following equation:

$$I_{Q0} = I_{Q01} + (V_{Href2} - V_{Href1})/X_L \quad (13)$$

The voltage setter 10 then, in step ST44, calculates and sets a new output terminal reference voltage $V_{Gref}$ of the first synchronous machine 1 according to the following equation (14):

$$V_{Gref} = V_{Href2}/n + X_t^* I_Q - X_{DR}/n^*(I_Q - I_{Q0}) \quad (14)$$

Similarly, the other voltage setter (not shown) intended for the second synchronous machine 1a calculates and sets a new output terminal reference voltage $V_{Gref}$ of the second synchronous machine 1a according to equation (14).

In this way, the output terminal reference voltage $V_{Gref}$ of each of the plurality of synchronous machines 1 and 2a is determined according to equation (14), and each of these synchronous machines 1 and 1a is controlled according to the output terminal reference voltage $V_{Gref}$. As a result, the output voltage $V_G$ of each of the plurality of synchronous machines and the high-side voltage $V_H$ of the corresponding tap-changer-equipped transformer can be expressed as follows:

$$V_G = V_{Href2}/n + X_t^* I_Q - X_{DR}/n^*[I_Q - \{I_{Q01} + (V_{Href2} - V_{Href1})/X_L\}] \quad (15)$$

$$V_H = V_{Href2} - X_{DR}^*[I_Q - \{I_{Q01} + (V_{Href2} - V_{Href1})/X_L\}] \quad (16)$$

As previously mentioned, the excitation controller in accordance with the fourth embodiment can change the reactive current reference value $I_{Q0}$ as the high-side reference voltage $V_{Href}$ of the plurality of tap-changer-equipped transformers changes. Accordingly, the present embodiment offers an advantage of being able to keep the transmission voltage of the transmission system constant and to maintain the actual output terminal voltage $V_G$ of each of the plurality of synchronous machines at about a nominal value even if the high-side reference voltage $V_{Href}$ of the plurality of tap-changer-equipped transformers is changed.

Embodiment 5

In the above-mentioned fourth embodiment, it is assumed that the reactance $X_L$ of the transmission line has a known value. However, the reactance $X_L$ of the transmission line can actually vary from moment to moment. In view of this, a voltage setter 10 according to a fifth embodiment is so constructed as to successively estimate the reactance $X_L$ of the transmission line that varies with time.

The effective power P and reactive power Q of each of the plurality of synchronous machines can be expressed by the following equations (17) and (18):

$$P = V_G * E_{fd} * \sin\delta/(X_d + X_L) \tag{17}$$

$$Q = E_{fd}^2 * X_L/(X_d+X_L)^2 - (X_L - X_d) * E_{fd} * \cos\delta/(X_d+X_L)^2 - X_d/(X_d+X_L)^2 \tag{18}$$

where $X_d$ is a synchronous reactance, and Efd is an internal voltage behind the synchronous reactance. The reactance $X_L$ of the transmission line can be calculated by eliminating the phase angle $\delta$ from above equations (17) and (18).

Thus the voltage setter of the fifth embodiment can determine the reactive current reference value $I_{Q0}$ using the accurate reactance $X_L$ of the transmission line at all times. Accordingly, the fifth embodiment offers an advantage of being to make the actual high-side voltage $V_H$ of the plurality of tap-changer-equipped transformers agree with the high-side reference voltage $V_{Href}$ with a high degree of accuracy, and to maintain the actual output terminal voltage $V_G$ of each of the plurality of synchronous machines at about a nominal value.

Embodiment 6

The excitation controller in accordance with the fourth embodiment calculates a new reactive current reference value $I_{Q0}$ from the previous and new high-side reference voltages $V_{Href1}$ and $V_{Href2}$ of the plurality of tap-changer-equipped transformers according to equation (13). In contrast, an excitation controller in accordance with a sixth embodiment of the present invention is so constructed as to detect the high-side voltage $V_H$ of the plurality of tap-changer-equipped transformers and determine the reactive current reference value $I_{Q0}$ from the detected high-side voltage $V_H$.

Figure 14:
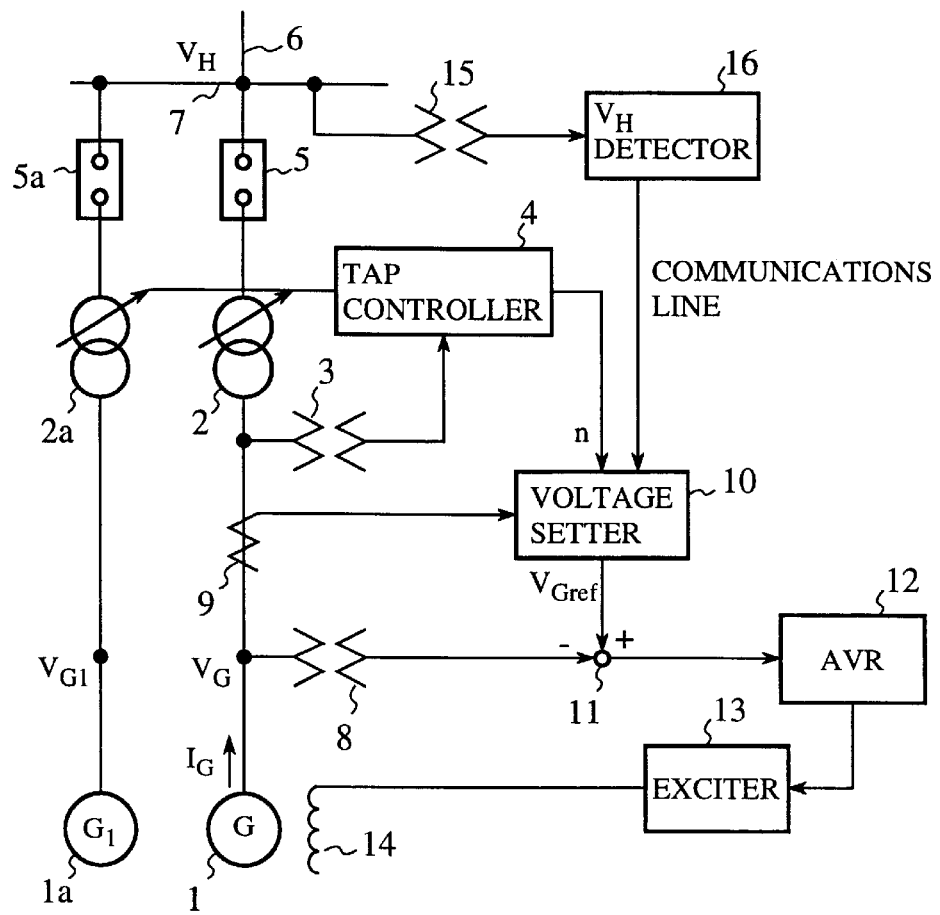
FIG. 14 is a block diagram showing the structure of an electric power system provided with an excitation controller according to a sixth embodiment of the present invention.

Referring next to FIG. 14, there is illustrated a block diagram showing the structure of an electric power system including the excitation controller according to the sixth embodiment. In the figure, reference numeral 15 denotes a voltage transformer or PT for measuring a voltage corresponding to the high-side voltage $V_H$ of the plurality of tap-changer-equipped transformers 2 and 2a, and numeral 16 denotes a $V_H$ detector for determining the high-side voltage $V_H$ of the plurality of tap-changer-equipped transformers 2 and 2a from the measurement result of the PT 15. The other structure of the excitation controller of the sixth embodiment is the same as that of the aforementioned fourth embodiment, with the exception that the voltage setter 10 uses a different method of calculating the reactive current reference value $I_{Q0}$, and therefore the description of the other structure will be omitted hereinafter.

Figure 15:
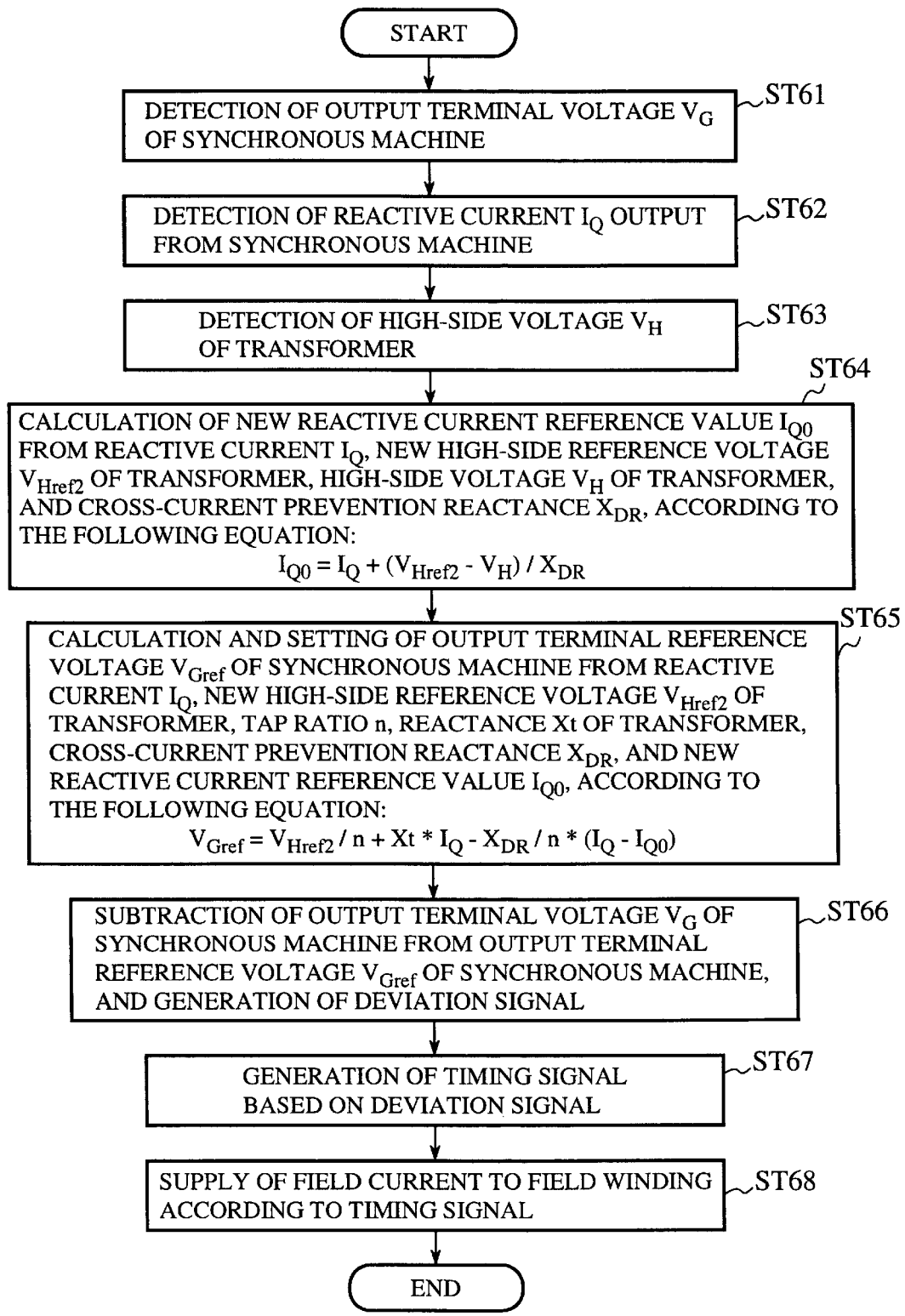
FIG. 15 is a flow diagram showing an excitation control method according to the sixth embodiment of the present invention.

Next, a description will be made as to the operation of the excitation controller of the sixth embodiment with reference to FIG. 15, a flowchart of an excitation control method in accordance with the sixth embodiment of the present invention. In the flowchart of FIG. 15, steps ST61, ST62, and ST65 to ST68 are the same as steps ST41, ST42, and ST44 to ST47 of FIG. 13, and therefore the description of those steps will be omitted hereinafter.

The $V_H$ detector 16, in step ST63, determines the high-side voltage $V_H$ of the plurality of tap-changer-equipped transformers 2 and 2a from the measurement result of the PD 15. The voltage setter 10 then, in step ST64, calculates a new reactive current reference value $I_{Q0}$ from the varied (i.e., new) high-side reference voltage $V_{Href2}$, the detected high-side voltage $V_H$, the reactive current $I_Q$ output from the corresponding synchronous machine 1, and the cross-current prevention reactance $X_{DR}$, according to the following equation (19):

$$I_{Q0} = I_Q - (V_{Href2} - V_H)/X_{DR} \tag{19}$$

Incidentally, when a signal indicating the detected high-side voltage $V_H$ is used as a feedback signal to make the high-side voltage $V_H$ agree with its reference value, the signal has to be a continuous one. In contrast, when the detected high-side voltage $V_H$ is used to calculate the reactive current reference value, like the present embodiment, there is no need to generate a continues signal indicating the detected high-side voltage $V_H$. Therefore, the detected high-side voltage $V_H$ can be notified of the voltage setter 10 through a communications line such as a telephone line.

As previously mentioned, the excitation controller in accordance with the sixth embodiment determines a new reactive current reference value $I_{Q0}$ from the detected high-side voltage $V_H$ of the plurality of tap-changer-equipped transformers and the reactive current $I_Q$ output from each of the plurality of synchronous machines. Accordingly, the sixth embodiment offers an advantage of being able to make the actual high-side voltage $V_H$ of the plurality of tap-changer-equipped transformers agree with its reference voltage $V_{Href}$ with a high degree of accuracy and to maintain the actual output terminal voltage $V_G$ of each of the plurality of synchronous machines at about a nominal value.

Embodiment 7

In the above-mentioned first embodiment, it is assumed that even if the tap ratio n of the tap-changer-equipped transformer is changed, the step-up ratio $n_v$ is the same as the reactance change ratio $n_r$. In contrast, an excitation controller in accordance with a seventh embodiment is so constructed as to control a synchronous machine connected, by way of a split winding type of tap-changer-equipped transformer whose step-up ratio $n_v$ and reactance change ratio $n_r$ differ from each other as the tap ratio n of the tap-changer-equipped transformer is changed, to a transmission system. The tap-changer-equipped transformer can be of core type, for example.

Figure 16:
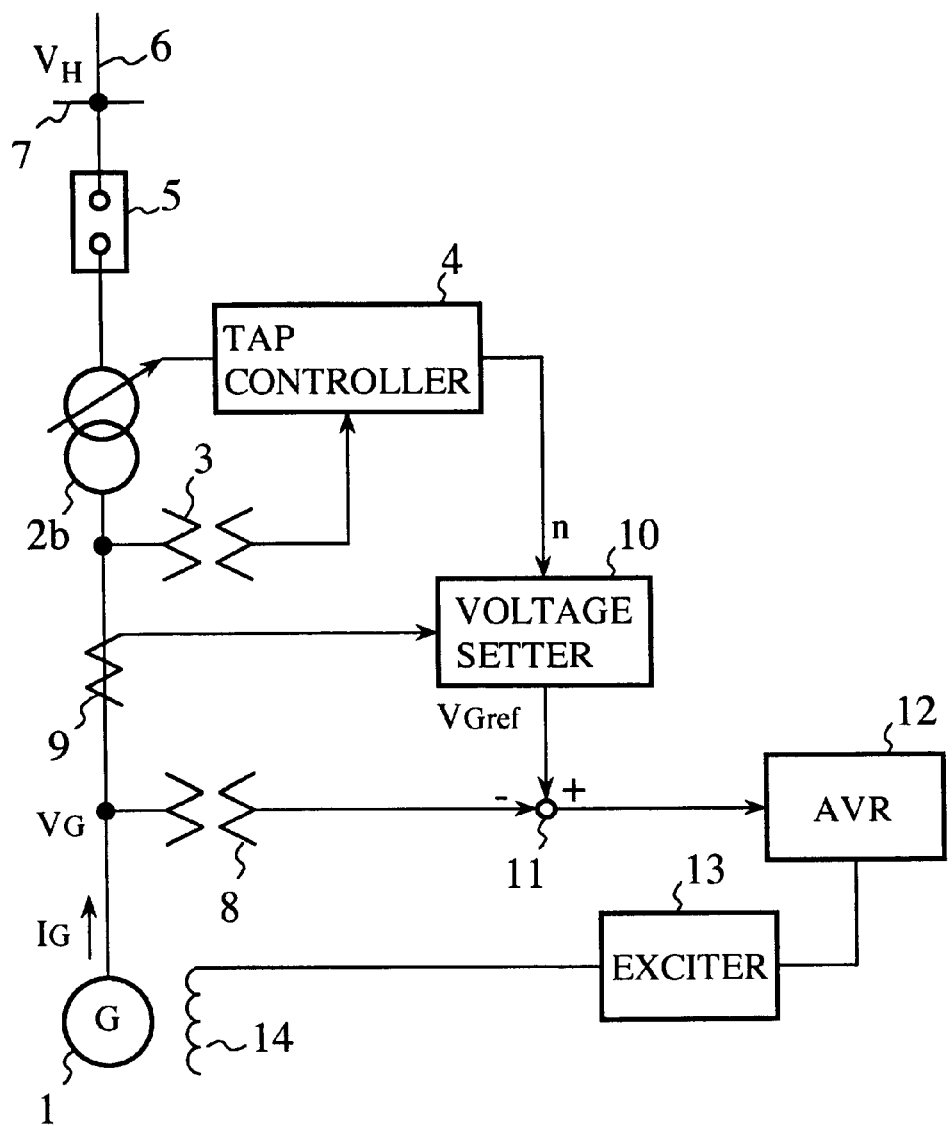
FIG. 16 is a block diagram showing the structure of an electric power system provided with an excitation controller according to a seventh embodiment of the present invention.

Referring next to FIG. 16, there is illustrated a block diagram showing the structure of an electric power system including the excitation controller according to the seventh embodiment. In the figure, reference numeral 2b denotes the split winding type of tap-changer-equipped transformer connected to a synchronous machine 1. The step-up ratio $n_v$ and reactance change ratio $n_r$ of the tap-changer-equipped transformer 2b differ from each other as the tap ratio n of the tap-changer-equipped transformer 2b is changed. The other structure of the excitation controller of the seventh embodiment is the same as that of the aforementioned first embodiment as shown in FIG. 1, and therefore the description of the other structure will be omitted hereinafter.

Figure 17:
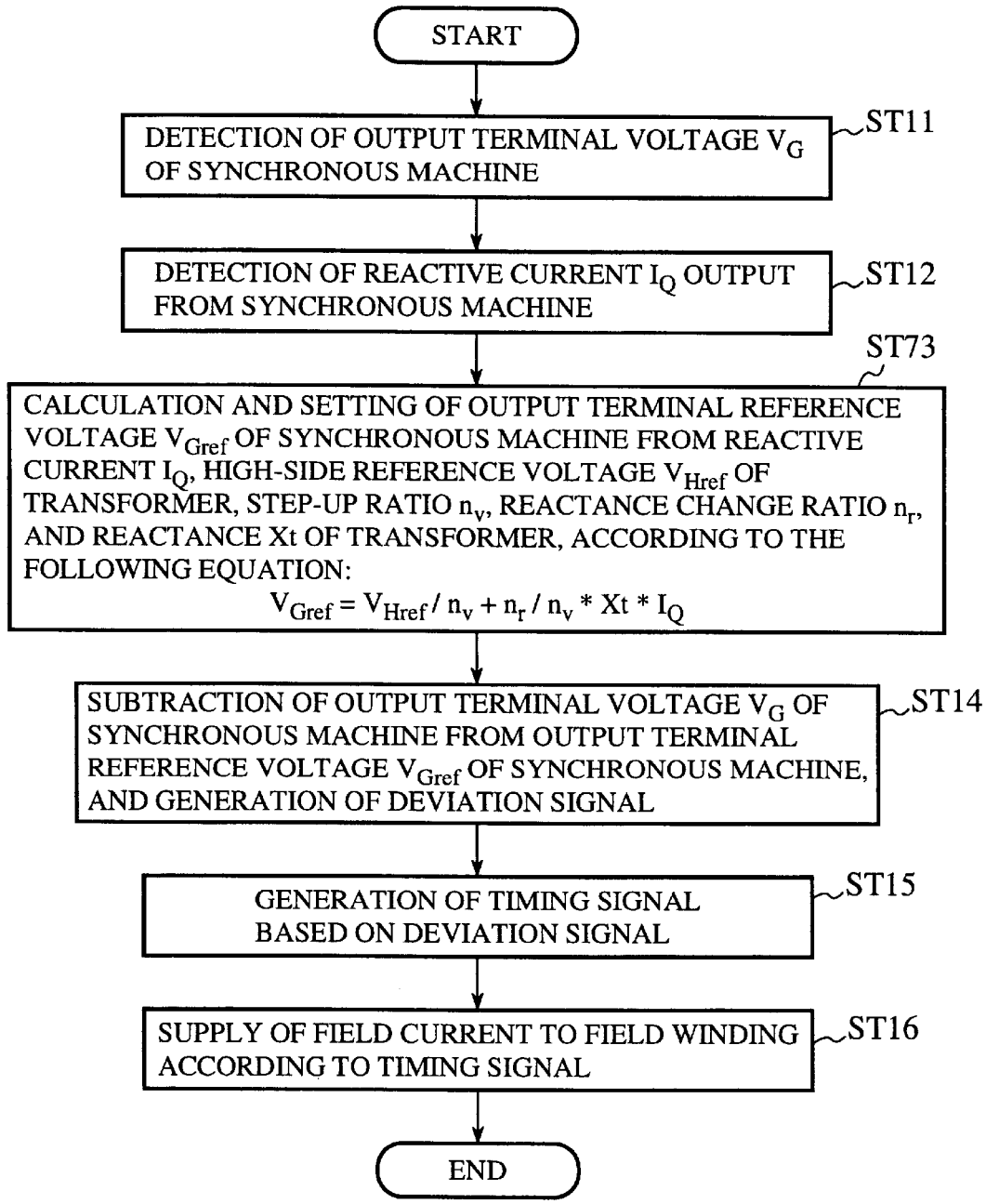
FIG. 17 is a flow diagram showing an excitation control method according to the seventh embodiment of the present invention.

Next, a description will be made as to the operation of the excitation controller of the seventh embodiment with reference to FIG. 17, a flowchart of an excitation control method in accordance with the seventh embodiment of the present invention. All steps of FIG. 17 except step ST73, which takes the place of ST13 of FIG. 5, are already shown in FIG. 5, and therefore the description of the same steps will be omitted hereinafter.

The voltage setter 10, in step ST73, calculates and sets the output terminal reference voltage $V_{Gref}$ of the synchronous machine 1 from the detected reactive current $I_Q$, the step-up ratio $n_v$, the reactance change ratio $n_r$, and the high-side reference voltage $V_{Href}$ of the tap-changer-equipped transformer 2b, according to the following equation (20):

$$V_{Gref} = V_{Href}/n_v + n_r/n_v * X_t * I_Q \quad (20)$$

Thus the output terminal voltage $V_G$ is controlled such that it agrees with the reference voltage $V_{Gref}$. There is a relationship, as expressed by the following equation (21), between the output terminal voltage $V_G$ of the synchronous machine 1 and the high-side voltage $V_H$ of the tap-changer-equipped transformer 2b.

$$V_H = n_v * V_G - n_r * X_t * I_Q \quad (21)$$

Accordingly, using the high-side reference voltage $V_{Href}$, the output terminal voltage $V_G$ of the synchronous machine 1 and the high-side voltage $V_H$ of the tap-changer-equipped transformer 2b can be given by the following equations (22) and (23):

$$V_G = V_{Href}/n_v + n_r/n_v * X_t * I_Q \quad (22)$$

$$V_H = V_{Href} \quad (23)$$

Thus, when the actual output terminal voltage $V_G$ of the synchronous machine 1 under normal operating conditions is high, by increasing the tap ratio n (n>1) (i.e., increasing the reactance change ratio $n_v$) by means of the tap controller 4, the excitation controller of the seventh embodiment can maintain the actual output terminal voltage $V_G$ of the synchronous machine 1 at about a nominal value. In addition, even though the current tap ratio is changed, the excitation controller of the seventh embodiment can control the actual high-side voltage $V_H$ of the tap-changer-equipped transformer 2b such that it agrees with the high-side reference voltage $V_{Href}$.

As previously mentioned, when the step-up ratio $n_v$ and reactance change ratio $n_r$ of the tap-changer-equipped transformer 2b differ from each other as the tap ratio n of the tap-changer-equipped transformer 2b is changed, the excitation controller in accordance with the seventh embodiment of the present invention sets the output terminal reference voltage $V_{Gref}$ of the synchronous machine 1 from the reactive current $I_Q$ output from the synchronous machine, the step-up ratio $n_v$, the reactance change ratio $n_r$, and the high-side reference voltage $V_{Href}$ of the tap-changer-equipped transformer, and then controls the field current to be supplied to the field winding of the synchronous machine according to the difference between the output terminal reference voltage $V_{Gref}$ and actual output terminal voltage $V_G$ of the synchronous machine. Accordingly, the present embodiment makes it possible to maintain the actual output terminal voltage $V_G$ of the synchronous machine at about a nominal value and to keep the voltage on the transmission bus constant even if the step-up ratio $n_v$ and reactance change ratio $n_r$ of the tap-changer-equipped transformer 2b differ from each other as the tap ratio n of the tap-changer-equipped transformer 2b is changed.

Embodiment 8

In the above-mentioned second embodiment in which a plurality of synchronous machines are connected, by way of respective tap-changer-equipped transformers, to a transmission system, it is assumed that the step-up ratio $n_v$ and reactance change ratio $n_r$ of each of the plurality of tap-changer-equipped transformers are of equal value even if the tap ratio n of each of the plurality of tap-changer-equipped transformers is changed. In contrast, an excitation controller in accordance with an eighth embodiment is so constructed as to control each of a plurality of synchronous machines (e.g., two synchronous machines) connected, by way of respective tap-changer-equipped transformers of split winding type, each of them having step-up ratio $n_v$ and reactance change ratio $n_r$ that differ from each other as the tap ratio n of each of the plurality of tap-changer-equipped transformers is changed, to a transmission system. Each tap-changer-equipped transformer can be of core type, for example.

For simplicity, the electric power system includes two synchronous machines. When the step-up ratio $n_v$ and reactance change ratio $n_r$ of each of the two tap-changer-equipped transformers differ from each other as the tap ratio n of each of the two tap-changer-equipped transformers is changed, there is a relationship between the high-side voltage $V_H$ of each of the two tap-changer-equipped transformers and the output terminal voltage $V_{Gi}$ (i=1, 2) of each of the two synchronous machines, which is expressed by each of the following equations:

$$V_H = n_v * V_{G1} - n_{r1} * X_t * I_{Q1} \quad (24)$$

$$V_H = n_v * V_{G2} - n_{r2} * X_t * I_{Q2} \quad (25)$$

where $n_v$ is the step-up ratio, $n_{r1}$ and $n_{r2}$ are the respective reactance change ratios of the two tap-changer-equipped transformers of split winding type respectively connected to the two synchronous machines, and $I_{Q1}$ and $I_{Q2}$ are the respective reactance currents output from the two synchronous machines.

When calculating the output terminal reference voltage of each of the two synchronous machines according to equation (5), as explained in Embodiment 2, the respective high-side voltages $V_{H1}$ and $V_{H2}$ of the two tap-changer-equipped transformers are given by the following equations:

$$V_{H1} = V_{Href} - \{X_{DR} - (n_v - n_{r1}) * X_t\} * I_{Q1} \quad (26)$$

$$V_{H2} = V_{Href} - \{X_{DR} - (n_v - n_{r2}) * X_t\} * I_{Q2} \quad (27)$$

Figure 18:
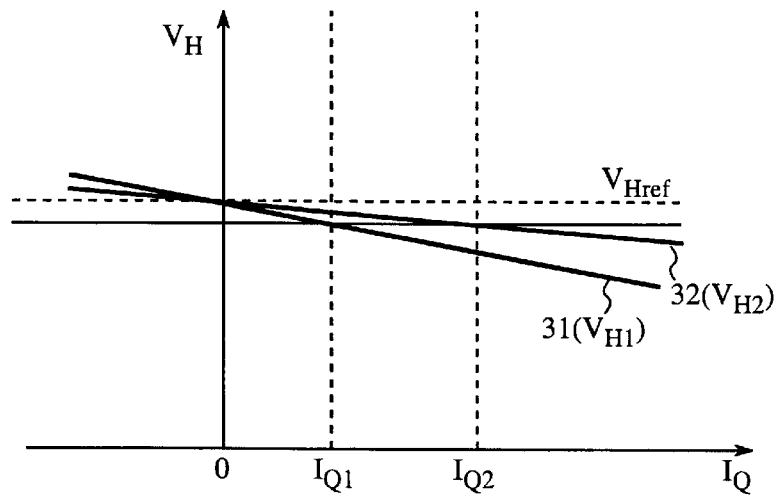
FIG. 18 is a graph showing a relationship between a high-side voltage of each of a plurality of tap-changer-equipped transformers of split winding type, which are connected to a plurality of synchronous machines, respectively, and a reactive current output from each of the plurality of synchronous machines.

Accordingly, when $n_{r1} > n_{r2}$, there are a relationship as shown in FIG. 18 between the high-side voltage $V_H$ of each of the first and second tap-changer-equipped transformers of split winding type connected to each of the first and second synchronous machines and the reactive current $I_{Q1}$ or $I_{Q2}$. As can be seen from FIG. 18, if $n_{r1} \neq n_{r2}$, it is impossible to control the two synchronous machines with a high degree of accuracy such that the high-side voltage $V_H$ of each of the two tap-changer-equipped transformers of split winding type agrees with its reference value $V_{Href}$, in addition to an unbalanced sharing of the total reactive current between the two synchronous machines.

In contrast, the excitation controller according to the eighth embodiment is so constructed as to properly control two or more synchronous machines, even if these synchronous machines are respectively connected to two or more tap-changer-equipped transformers of split winding type, each of them having step-up ratio $n_v$ and reactance change ratio $n_r$ that differ from each other as the tap ratio n of each of the plurality of tap-changer-equipped transformers is changed.

Figure 19:
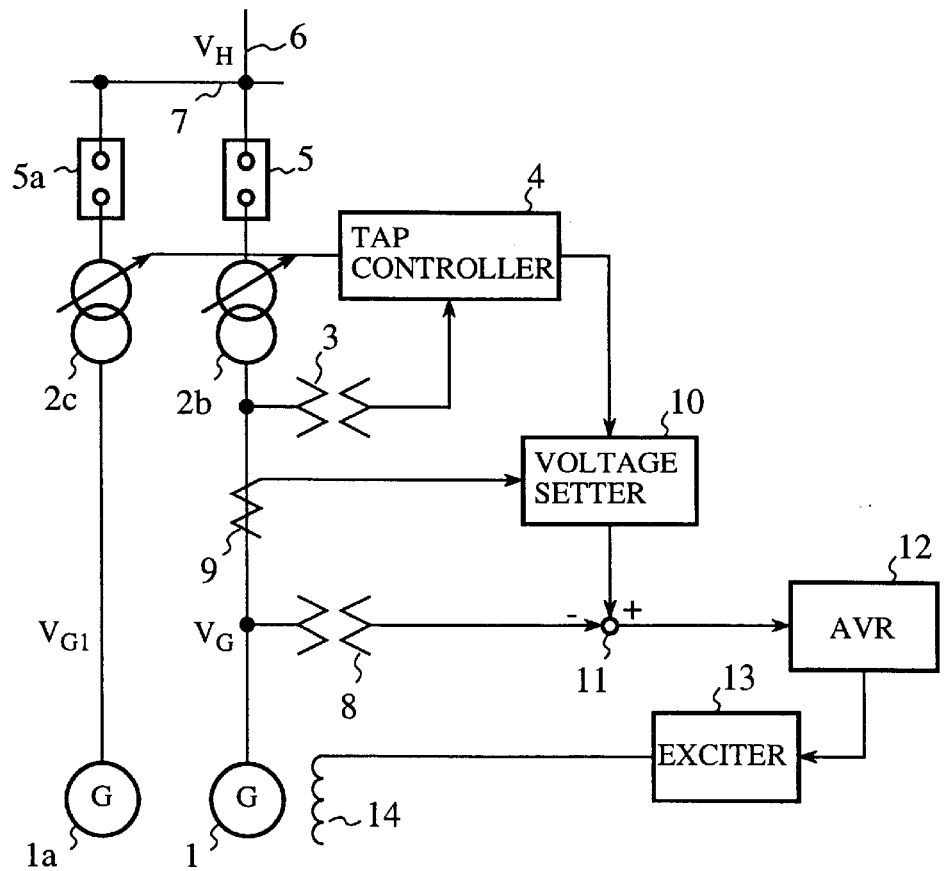
FIG. 19 is a block diagram showing the structure of an electric power system provided with an excitation controller according to an eighth embodiment of the present invention.

Referring next to FIG. 19, there is illustrated a block diagram showing the structure of an electric power system including the excitation controller according to the eighth embodiment. In the figure, reference numeral 2b denotes a tap-changer-equipped transformer of split winding type connected to a synchronous machine 1, and numeral 2c denotes another tap-changer-equipped transformer of split winding type connected to another synchronous machine 1a. The step-up ratio $n_v$ and reactance change ratio $n_{r1}$ of the first tap-changer-equipped transformer 2b differ from each other as the tap ratio n of the tap-changer-equipped transformer 2b is changed. Also, the step-up ratio $n_v$ and reactance change ratio $n_{r2}$ of the second tap-changer-equipped transformer 2c differ from each other as the tap ratio n of the tap-changer-equipped transformer 2c is changed. The other structure of the excitation controller of the eighth embodiment is the same as that of the aforementioned second embodiment as shown in FIG. 6, and therefore the description of the other structure will be omitted hereinafter.

Figure 20:
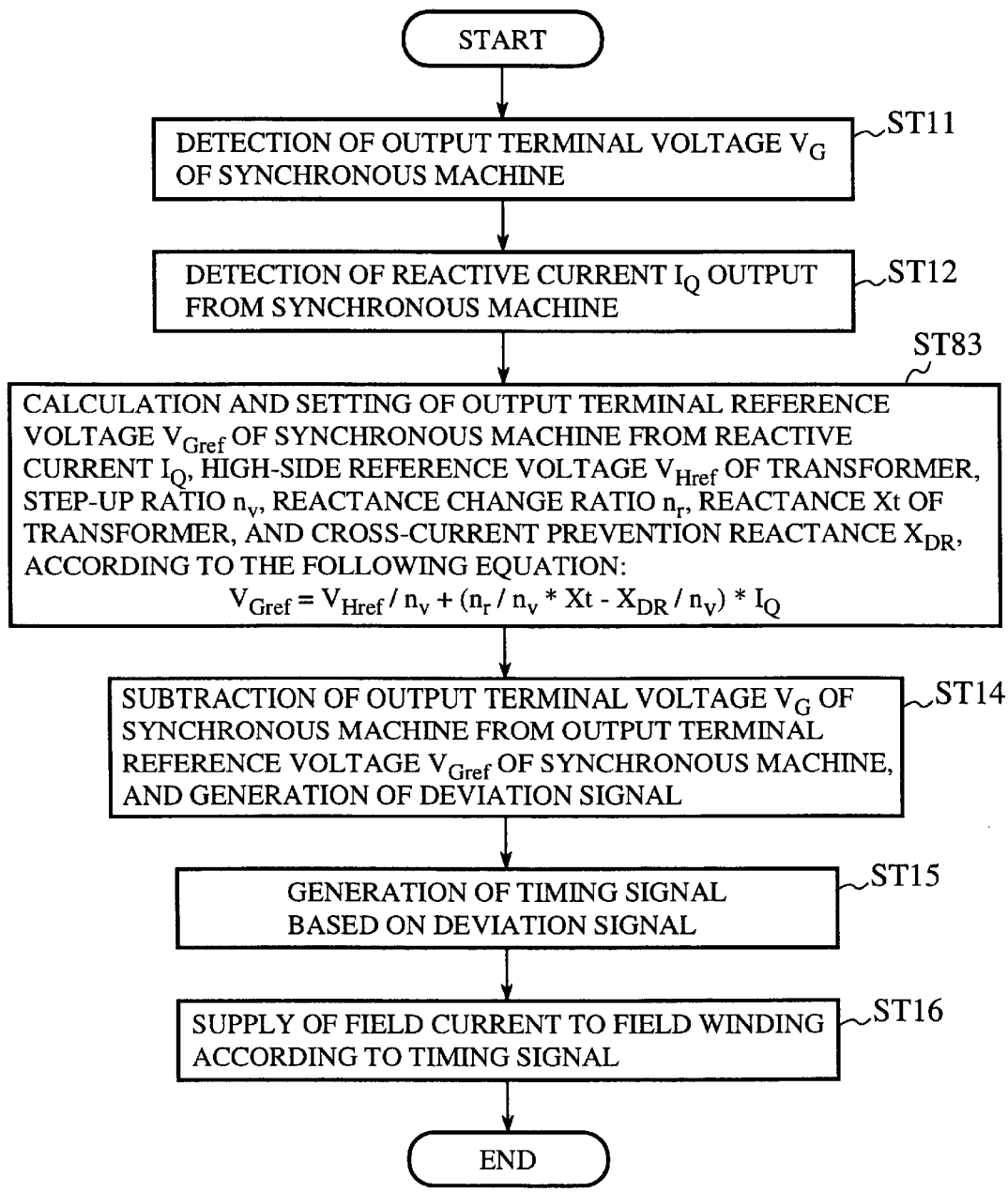
FIG. 20 is a flow diagram showing an excitation control method according to the eighth embodiment of the present invention.

Next, a description will be made as to the operation of the excitation controller of the eighth embodiment with reference to FIG. 20, a flowchart of an excitation control method in accordance with the eighth embodiment of the present invention. All steps of FIG. 20 except step ST83, which takes the place of step ST13 of FIG. 5, are already shown in FIG. 5, and therefore the description of the same steps will be omitted hereinafter.

The voltage setter 10, in step ST83, calculates and sets the output terminal reference voltage $V_{Gref}$ of the first synchronous machine 1 from the detected reactive current $I_Q$, the step-up ratio $n_v$ and reactance change ratio $n_r$ (=$n_{r1}$) of the first tap-changer-equipped transformer 2b and the high-side reference voltage $V_{Href}$, according to the following equation (28):

$$V_{Gref}=V_{Href}/n_v+(n_r/n_v*X_t-X_{DR}/n_v)*I_Q \quad (28)$$

Similarly, another voltage setter (not shown) intended for the second synchronous machine 1a calculates and sets the output terminal reference voltage $V_{Gref}$ of the second synchronous machine 1a from the detected reactive current $I_Q$, the step-up ratio $n_v$ and reactance change ratio $n_r$ (=$n_{r2}$) of the second tap-changer-equipped transformer 2c, and the high-side reference voltage $V_{Href}$, according to equation (28).

Thus the actual output terminal voltage $V_{G1}$ or $V_{G2}$ of each of the two synchronous machines 1 and 1a is controlled such that it agrees with its reference value $V_{Gref}$. There is a relationship, as expressed by the following equation (29), between the output terminal voltage $V_G$ of the first synchronous machine 1 and the high-side voltage $V_H$ of the first tap-changer-equipped transformer 2b.

$$V_H=n_v*V_G-n_r*X_t*I_Q \quad (29)$$

Accordingly, using the high-side reference voltage $V_{Href}$, the output terminal voltage $V_G$ of the first synchronous machine 1 and the high-side voltage $V_H$ of the first tap-changer-equipped transformer 2b can be given by the following equations (30) and (31):

$$V_G=V_{Href}/n_v+(n_r/n_v*X_t-X_{DR}/n_v)*I_Q \quad (30)$$

$$V_H=V_{Href}-X_{DR}*I_Q \quad (31)$$

Thus, when the actual output terminal voltage $V_G$ of the first synchronous machine 1 under normal operating conditions is high, by increasing the tap ratio n (n>1) by means of the tap controller 4, the excitation controller of the eighth embodiment can maintain the actual output terminal voltage $V_G$ of the first synchronous machine 1 at about a nominal value. Similarly, when the output terminal voltage $V_G$ of the second synchronous machine 1a under normal operating conditions is high, by increasing the tap ratio n (n>1) by means of the tap controller 4, the excitation controller of the eighth embodiment can maintain the actual output terminal voltage $V_G$ of the second synchronous machine 1a at about a nominal value. In addition, even though the tap ratio of one tap-changer-equipped transformer 2b or 2c is changed, the excitation controller of the eighth embodiment can control the actual high-side voltage $V_H$ of the tap-changer-equipped transformer 2b or 2c such that it agrees with the high-side reference voltage $V_{Href}$.

As previously mentioned, the excitation controller in accordance with the eighth embodiment of the present invention sets the output terminal reference voltage $V_{Gref}$ of each of the plurality of synchronous machines from the reactive current $I_Q$ output from each of the plurality of synchronous machines, the step-up ratio $n_v$, the reactance change ratio $n_r$, and the high-side reference voltage $V_{Href}$ of each of the plurality of tap-changer-equipped transformers connected to each of the plurality of synchronous machines, and controls the field current to be supplied to the field winding of each of the plurality of synchronous machines according to the difference between the output terminal reference voltage $V_{Gref}$ and the actual output terminal voltage $V_G$, when the step-up ratio $n_v$ and reactance change ratio $n_r$ of each of the plurality of tap-changer-equipped transformers differ from each other as the tap ratio n of each of the plurality of tap-changer-equipped transformers is changed. Accordingly, the present embodiment makes it possible to maintain the actual output terminal voltage $V_G$ of each of the plurality of synchronous machines at a nominal value and to keep the voltage on the transmission bus constant even if the step-up ratio $n_v$ and reactance change ratio $n_r$ of each of the plurality of tap-changer-equipped transformers differ from each other as the tap ratio n of each of the plurality of tap-changer-equipped transformers is changed. In addition, the present embodiment offers an advantage of being able to offer a more equivalent sharing of the total reactive current among the plurality of generators.

Embodiment 9

The excitation controller in accordance with the above-mentioned second embodiment, which employs a plurality of tap-changer-equipped transformers each of which has a step-up ratio $n_v$ and a reactance change ratio $n_r$ that are the same as the tap ratio n, sets the output terminal reference voltage $V_{Gref}$ of each synchronous machine from the reactive current $I_Q$ output from each synchronous machine, the reactive current reference value $I_{Q0}$, the tap ratio n, and the high-side reference voltage $V_{Href}$ of the plurality of tap-changer-equipped transformers, according to equation (5). In contrast, in accordance with a ninth embodiment, there is provided an excitation controller that employs a plurality of tap-changer-equipped transformers each of which has a step-up ratio $n_v$ and a reactance change ratio $n_r$ that differ from each other as the tap ratio n is changed, and that sets the output terminal reference voltage $V_{Gref}$ of each synchronous machine from the reactive current $I_Q$ output from each synchronous machine, the reactive current reference value $I_{Q0}$, the step-up ratio $n_v$ and reactance change ratio $n_r$ of each of the plurality of tap-changer-equipped transformers, and the high-side reference voltage $V_{Href}$ of the plurality of tap-changer-equipped transformers.

An electric power system including the excitation controller according to the ninth embodiment has the same structure as that of the aforementioned eighth embodiment as shown in FIG. 19, and therefore the description of the structure will be omitted hereinafter.

Figure 21:
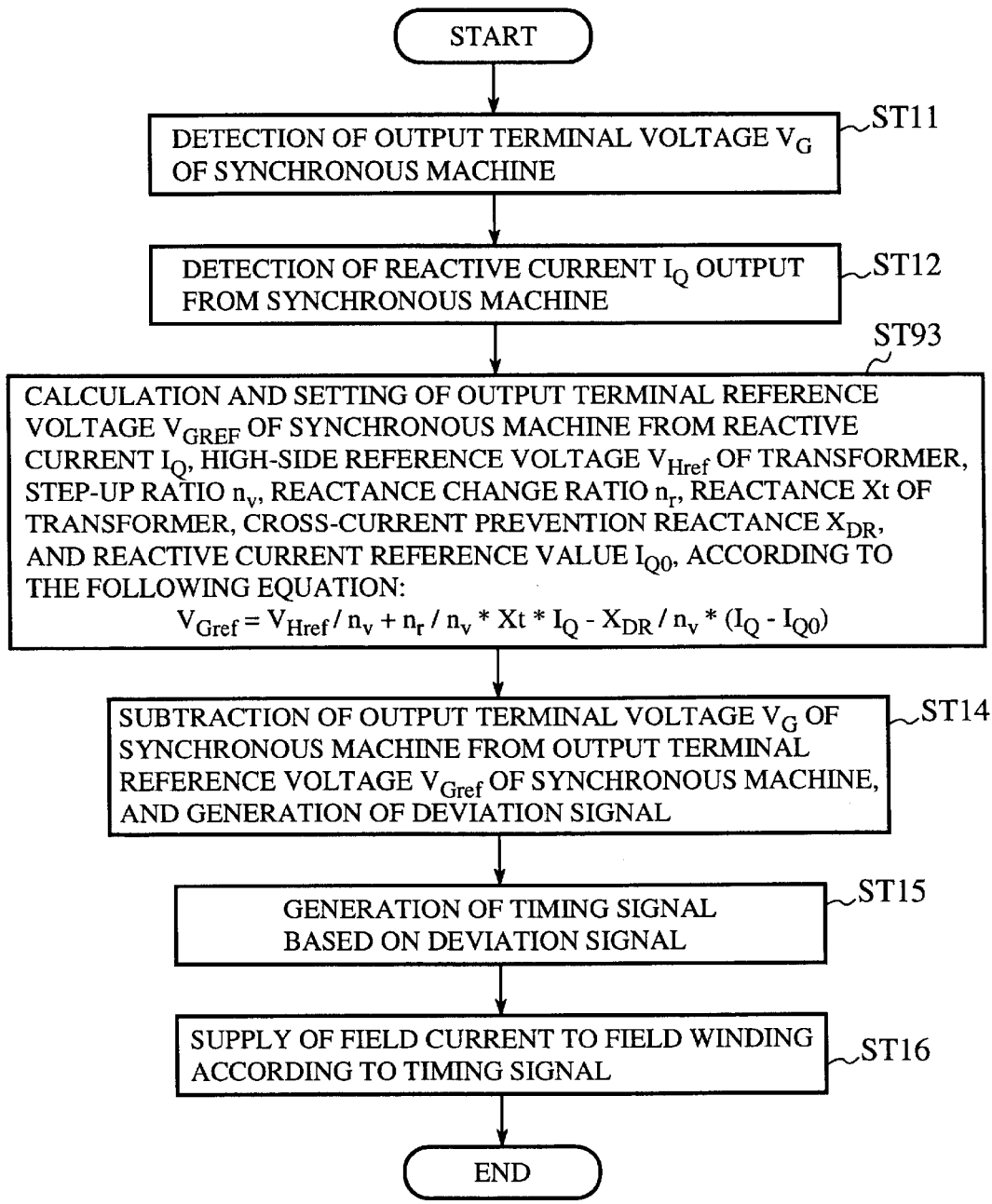
FIG. 21 is a flow diagram showing an excitation control method according to a ninth embodiment of the present invention.

Next, a description will be made as to the operation of the excitation controller of the ninth embodiment with reference to FIG. 21, a flowchart of an excitation control method in accordance with the ninth embodiment of the present invention. All steps of FIG. 21 except step ST93, which takes the place of step ST13 of FIG. 5, are already shown in FIG. 5, and therefore the description of those steps will be omitted hereinafter.

The voltage setter 10, in step ST93, calculates and sets the output terminal reference voltage $V_{Gref}$ of the first synchronous machine 1 from the reactive current $I_Q$ output from the synchronous machine 1, the reactive current reference value $I_{Q0}$, the step-up ratio $n_v$ and reactance change ratio $n_r$ ($=n_{r1}$) of the first tap-changer-equipped transformer 2b, and the high-side reference voltage $V_{Href}$ of the first tap-changer-equipped transformer 2b, according to the following equation (32):

$$V_{Gref}=V_{Href}/n_v+n_r/n_v*X_t*I_Q-X_{DR}/n_v*(I_Q-I_{Q0}) \quad (32)$$

Similarly, another voltage setter (not shown) intended for the second synchronous machine 1a calculates and sets the output terminal reference voltage $V_{Gref}$ of the second synchronous machine 1a from the reactive current $I_Q$ output from the second synchronous machine 1a, the reactive current reference value $I_{Q0}$, the step-up ratio $n_v$ and reactance change ratio $n_r$ ($=n_{r2}$) of the second tap-changer-equipped transformer 2c, and the high-side reference voltage $V_{Href}$ of the second tap-changer-equipped transformer 2c, according to equation (32).

In this way, the output terminal reference voltage $V_{Gref}$ of each of the first and second synchronous machine 1 and 1a is determined according to equation (32), and each of these synchronous machines 1 and 1a is controlled according to the output terminal reference voltage $V_{Gref}$. As a result, the output terminal voltage $V_G$ of each of the plurality of synchronous machines and the high-side voltage $V_H$ of each of the plurality of tap-changer-equipped transformers can be given by the following equations:

$$V_G=V_{Href}/n_v+n_r/n_v*X_t*I_Q-X_{DR}/n_v*(I_Q-I_{Q0}) \quad (33)$$

$$V_H=V_{Href}-X_{DR}*(I_Q-I_{Q0}) \quad (34)$$

As previously mentioned, when the reactive current $I_Q$ output from each of the plurality of synchronous machines agrees with its reference value $I_{Q0}$ other than zero, the excitation controller in accordance with the ninth embodiment of the present invention sets the output terminal reference voltage $V_{Gref}$ of each of the plurality of synchronous machines such that the actual high-side voltage $V_H$ of the plurality of tap-changer-equipped transformers agrees with the high-side reference voltage $V_{Href}$, even if the step-up ratio $n_v$ and reactance change ratio $n_r$ of the tap-changer-equipped transformer differ from each other. Accordingly, the excitation controller according to the present embodiment can make the actual high-side voltage $V_H$ of the plurality of tap-changer-equipped transformers agree with the high-side reference voltage $V_{Href}$ more precisely than the excitation controller according to the aforementioned eighth embodiment does. Furthermore, the excitation controller according to the present embodiment can maintain the actual output terminal voltage $V_G$ of each of the plurality of synchronous machines at about a nominal value. In addition, the present embodiment offers an advantage of being able to offer a more equivalent sharing of the total reactive current among the plurality of generators.

Embodiment 10

The excitation controller in accordance with the above-mentioned fourth embodiment, which employs a plurality of tap-changer-equipped transformers each of which has a step-up ratio $n_v$ and a reactance change ratio $n_r$ that are the same as the tap ratio n, calculates a new reactive current reference value $I_{Q0}$ corresponding to a varied (or new) high-side reference voltage $V_{Href2}$ from the difference between a previous high-side reference voltage $V_{Href1}$ and the varied high-side reference voltage $V_{Href2}$, and the reactance of the transmission line. In contrast, in accordance with a tenth embodiment, there is provided an excitation controller that employs a plurality of tap-changer-equipped transformers each of which has a step-up ratio $n_v$ and a reactance change ratio $n_r$ that differ from each other as the tap ratio n is changed, and that calculates the new reactive current reference value $I_{Q0}$ corresponding to the varied (or new) high-side reference voltage $V_{Href2}$ from the difference between the previous high-side reference voltage $V_{Href1}$ and the varied high-side reference voltage $V_{Href2}$, and the reactance of the transmission line and sets the output terminal reference voltage $V_{Gref}$ of each synchronous machine from the new reactive current reference value $I_{Q0}$.

An electric power system including the excitation controller according to the tenth embodiment has the same structure as that of the aforementioned eighth embodiment as shown in FIG. 19, and therefore the description of the structure will be omitted hereinafter.

Figure 22:
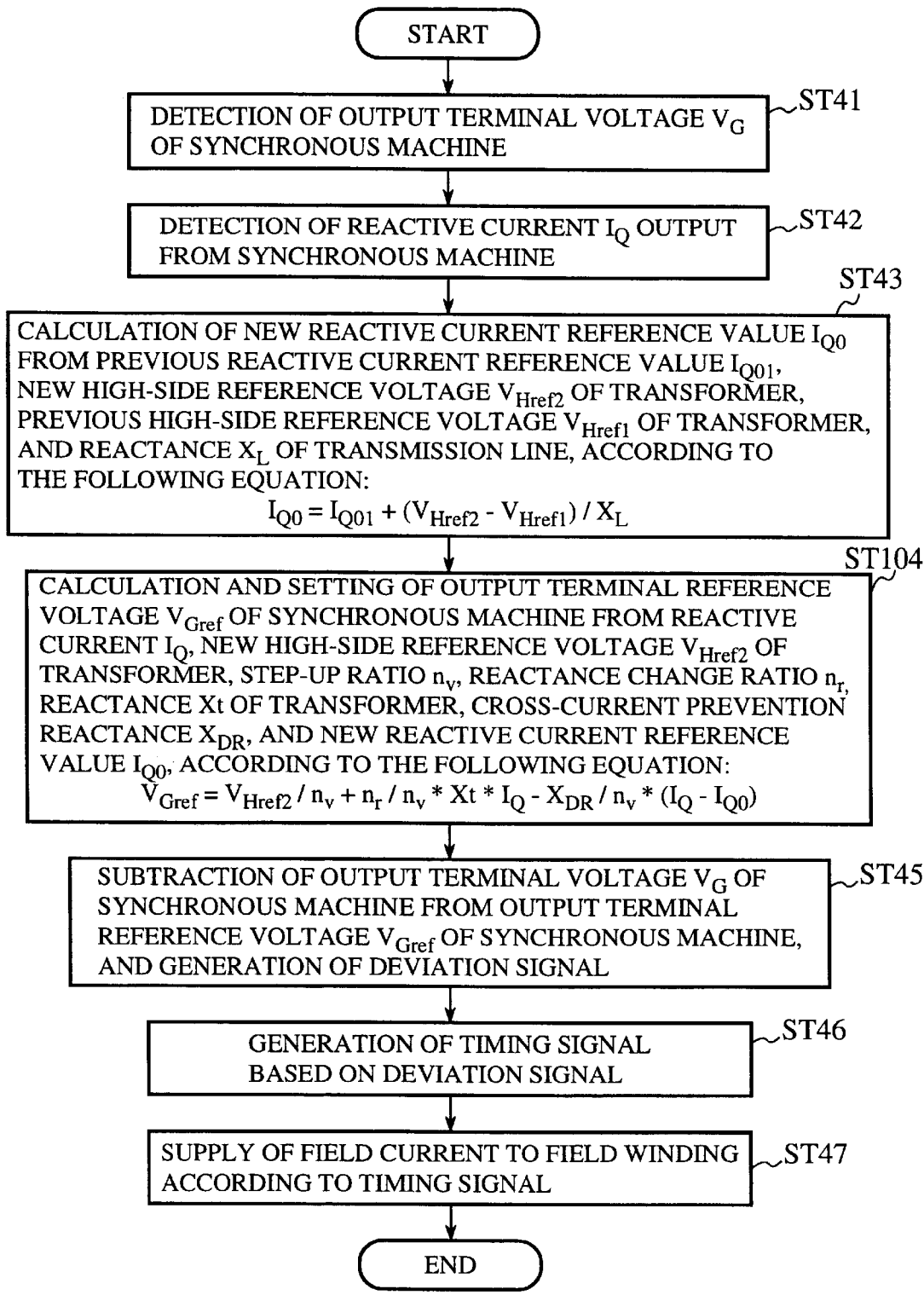
FIG. 22 is a flow diagram showing an excitation control method according to a tenth embodiment of the present invention.
Figure 23:
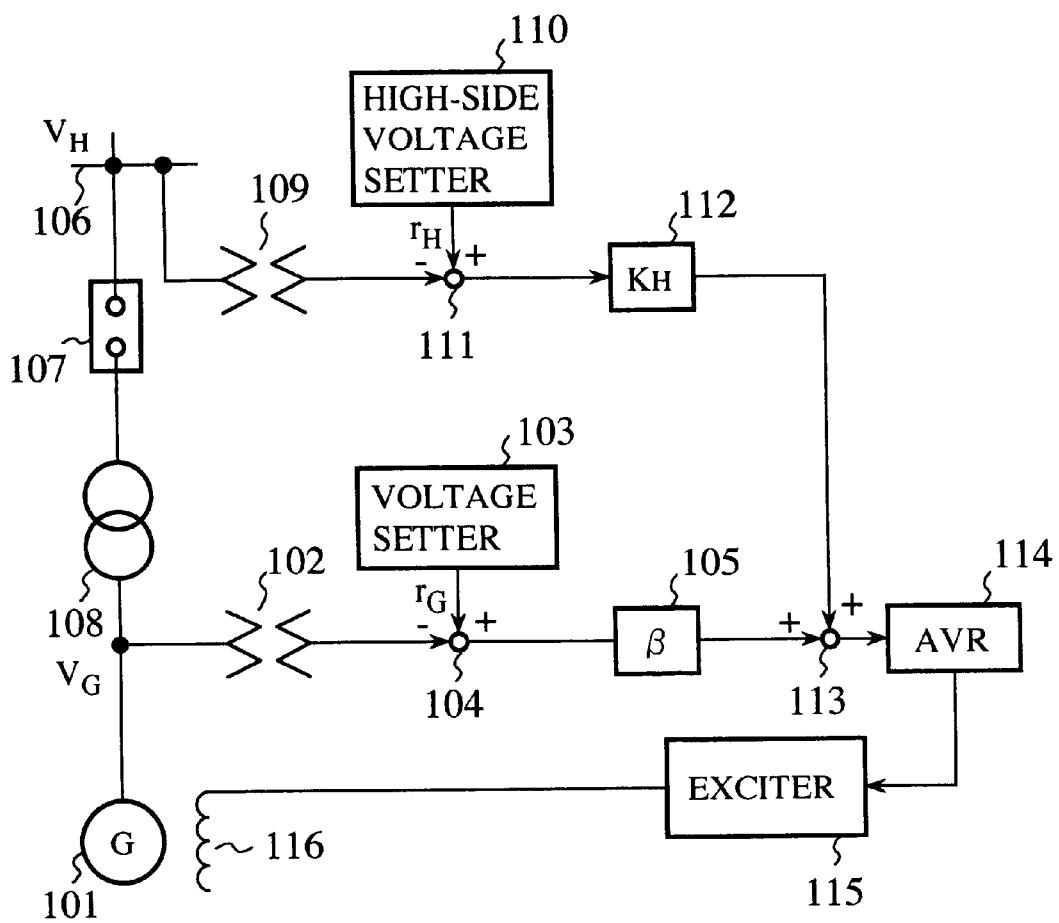
FIG. 23 is a block diagram showing the structure of an electric power system provided with a prior art excitation controller.

Next, a description will be made as to the operation of the excitation controller of the tenth embodiment with reference to FIG. 22, a flowchart of an excitation control method in accordance with the tenth embodiment of the present invention. All steps of FIG. 22 except step ST104, which takes the place of step ST44 of FIG. 13, are already shown in FIG. 13, and therefore the description of the same steps will be omitted hereinafter.

The voltage setter 10, in step ST104, calculates and sets the output terminal reference voltage $V_{Gref}$ of the first synchronous machine 1 from the reactive current $I_Q$ output from the synchronous machine 1, the reactive current reference value $I_{Q0}$ given by equation (9), the step-up ratio $n_v$ and reactance change ratio $n_r$ ($=n_{r1}$) of the first tap-changer-equipped transformer 2b, and the new high-side reference voltage $V_{Href2}$ of the first tap-changer-equipped transformer 2b, according to the following equation (35):

$$V_{Gref}=V_{Href2}/n_v+n_r/n_v*X_t*I_Q-X_{DR}/n_v*(I_Q-I_{Q0}) \quad (35)$$

Similarly, another voltage setter (not shown) intended for the second synchronous machine 1a calculates and sets the output terminal reference voltage $V_{Gref}$ of the second synchronous machine 1a from the reactive current $I_Q$ output from the second synchronous machine 1a, the reactive current reference value $I_{Q0}$ given by equation (9), the step-up ratio $n_v$ and reactance change ratio $n_r$ ($=n_{r2}$) of the second tap-changer-equipped transformer 2c, and the new high-side reference voltage $V_{Href2}$ of the second tap-changer-equipped transformer 2c, according to equation (35).

Thus the output terminal voltage $V_G$ of each of the first synchronous machines 1 and 1a and the high-side voltage $V_H$ of each of the first and second tap-changer-equipped transformers 2b and 2c can be given by the following equations:

$$V_G=V_{Href2}/n_v+n_r/n_v*X_t*I_Q-X_{DR}/n_v*[I_Q-\{I_{Q01}+(V_{Href2}-V_{Href1})/X_L\}] \quad (36)$$

$$V_H=V_{Href2}-X_{DR}*[I_Q-\{I_{Q01}+(V_{Href2}-V_{Href1})/X_L\}] \quad (37)$$

As previously mentioned, the excitation controller in accordance with the tenth embodiment of the present invention can set the output terminal reference voltage $V_{Gref}$ of each of the plurality of synchronous machines using the new reactive current reference value $I_{Q0}$ corresponding to the high-side reference voltage $V_{Href}$, even when the step-up ratio $n_v$ and reactance change ratio $n_r$ of each of the plurality of tap-changer-equipped transformers differ from each other. Accordingly, the excitation controller according to the present embodiment can keep the voltage on the transmission system constant even if the reference voltage $V_{Href}$ is changed. Furthermore, the excitation controller according to the present embodiment can maintain the actual output terminal voltage $V_G$ of each of the plurality of synchronous machines at about a nominal value. In addition, the present embodiment offers an advantage of being able to offer a more equivalent sharing of the total reactive current among the plurality of generators.

Many widely different embodiments of the present invention may be constructed without departing from the spirit and scope of the present invention. It should be understood that the present invention is not limited to the specific embodiments described in the specification, except as defined in the appended claims.

What is claimed is:

1. An excitation controller comprising:
    a reactive current detector for detecting a reactive current output from a first synchronous machine connected, by way of a tap-changer-equipped transformer including a tap changer for changing taps of the tap-changer-equipped transformer under load conditions, to a transmission system;
    a tap controller for setting a tap ratio of the tap-changer-equipped transformer in response to an output terminal voltage of the first synchronous machine;
    a voltage setter for setting a first reference voltage for an output voltage of the first synchronous machine based on a second reference voltage of the tap-changer-equipped transformer at a side connected to the transmission system, the tap ratio set by said tap controller, and the reactive current detected by said reactive current detector; and
    control means for controlling an excitation system for exciting the first synchronous machine in response to the first reference voltage set by said voltage setter.

2. The excitation controller according to claim 1, wherein said voltage setter obtains the first reference voltage by dividing the second reference voltage by the tap ratio to produce a division result, and adding a voltage drop in the tap-changer-equipped transformer to the division result, the voltage drop being obtained from the reactive current.

3. The excitation controller according to claim 2, wherein a second synchronous machine is connected to the transmission system, and said voltage setter obtains the voltage drop based on reactance of the tap-changer-equipped transformer and a cross-current prevention reactance for preventing any cross current from flowing between the first and second synchronous machines.

4. The excitation controller according to claim 1, wherein said voltage setter obtains the first reference voltage by dividing the second reference voltage by a step-up ratio corresponding to the tap ratio to produce a division result, and adding a voltage drop in the tap-changer-equipped transformer to the division result, the voltage drop being obtained from a reactance change ratio corresponding to the tap ratio.

5. The excitation controller according to claim 4, wherein a second synchronous machine is connected to the transmission system, and said voltage setter obtains the voltage drop based on the step-up ratio, the reactance change ratio, and a cross-current prevention reactance for preventing any cross current from flowing between the first and second synchronous machines.

6. The excitation controller according to claim 3, wherein when the reactive current has a reference value other than zero, said voltage setter sets the first reference voltage of the tap-changer-equipped transformer so that a voltage drop due to the cross-current prevention reactance becomes zero.

7. An excitation control method comprising:
    setting a first reference voltage for an output voltage of a first synchronous machine at a connection to a tap-changer-equipped transformer including a tap changer for changing taps under load conditions based on a reactive current output from the first synchronous machine connected, by way of the tap-changer-equipped transformer, to a transmission system, a tap ratio of the tap-changer-equipped transformer, and a second reference voltage at a side of the tap-changer-equipped transformer connected to the transmission system; and
    controlling an excitation system for exciting the first synchronous machine according to the first reference voltage.

8. The excitation control method according to claim 7, wherein setting includes obtaining the first reference voltage by dividing the second reference voltage by the tap ratio to produce a division result, and adding a voltage drop in the tap-changer-equipped transformer to the division result, the voltage drop being obtained from the reactive current.

9. The excitation control method according to claim 8, wherein setting includes obtaining the voltage drop based on a reactance of the tap-changer-equipped transformer and a cross-current prevention reactance for preventing any cross current from flowing between the first synchronous machine and a second synchronous machine connected to the transmission system.

10. The excitation control method according to claim 7, wherein setting includes obtaining a step-up ratio and a reactance change ratio corresponding to the tap ratio, and obtaining the first reference voltage by dividing the second reference voltage by the step-up ratio to produce a division result, and adding a voltage drop in the tap-changer-equipped transformer to the division result, the voltage drop being obtained from the reactance change ratio.

11. The excitation control method according to claim 10, wherein setting includes obtaining the voltage drop based on the step-up ratio, the reactance change ratio, and a cross-current prevention reactance for preventing any cross current from flowing between the first synchronous machine and a second synchronous machine connected to the transmission system.

12. The excitation control method according to claim 9, wherein setting includes setting the first reference voltage of the tap-changer-equipped transformer so that the voltage drop due to the cross-current prevention reactance becomes zero, when the reactive current has a reference value other than zero.

13. The excitation control method according to claim 12, further comprising setting the reference value according to a voltage of the tap-changer-equipped transformer at a connection to the transmission system.

14. The excitation control method according to claim 12, further comprising setting the reference value according to a difference between a previous second reference voltage and a current second reference voltage, and a reactance of a transmission line of the transmission system.

15. The excitation control method according to claim 14, further comprising estimating the reactance of the transmission line of the transmission system.

* * * * *